(12) United States Patent
Hendry et al.

(10) Patent No.: US 11,653,005 B2
(45) Date of Patent: May 16, 2023

(54) HARMONIZATION OF RASTER SCAN AND RECTANGULAR TILE GROUPS IN VIDEO CODING

(71) Applicant: Huawei Technologies Co., Ltd., Shenzhen (CN)

(72) Inventors: FNU Hendry, San Diego, CA (US); Ye-Kui Wang, San Diego, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/348,719

(22) Filed: Jun. 15, 2021

(65) Prior Publication Data

US 2021/0314577 A1 Oct. 7, 2021

Related U.S. Application Data

(63) Continuation of application No. PCT/US2019/066884, filed on Dec. 17, 2019.

(60) Provisional application No. 62/848,149, filed on May 15, 2019, provisional application No. 62/780,771, filed on Dec. 17, 2018.

(51) Int. Cl.
| | |
|---|---|
| *H04N 19/174* | (2014.01) |
| *H04N 19/117* | (2014.01) |
| *H04N 19/134* | (2014.01) |
| *H04N 19/172* | (2014.01) |
| *H04N 19/136* | (2014.01) |
| *H04N 19/159* | (2014.01) |

(52) U.S. Cl.
CPC ......... *H04N 19/174* (2014.11); *H04N 19/117* (2014.11); *H04N 19/134* (2014.11); *H04N 19/136* (2014.11); *H04N 19/159* (2014.11); *H04N 19/172* (2014.11)

(58) Field of Classification Search
CPC .................................................... H04N 19/174
USPC ..................................................... 375/240.12
See application file for complete search history.

(56) References Cited

U.S. PATENT DOCUMENTS

2011/0304608 A1* 12/2011 Yang ...................... G06T 11/40
345/419
2013/0016786 A1 1/2013 Segall
(Continued)

FOREIGN PATENT DOCUMENTS

| CN | 103975596 A | 8/2014 |
|---|---|---|
| CN | 104813662 A | 7/2015 |

(Continued)

OTHER PUBLICATIONS

"Line Transmission of Non-Telephone Signals Video Codec for Audiovisual Services at p x 64 kbits," ITU-T Recommendation H.261, Mar. 1993, 29 pages.
(Continued)

*Primary Examiner* — Yulin Sun
(74) *Attorney, Agent, or Firm* — Conley Rose, P.C.

(57) ABSTRACT

A video coding mechanism is disclosed. The mechanism includes partitioning a picture into a plurality of tiles. A number of the tiles are included in a tile group. A flag is also encoded into a parameter set of a bitstream. The flag is set to a first value when the tile group is a raster scan tile group and a second value when the tile group is a rectangular tile group. The tiles are encoded into the bitstream based on the tile group. The bitstream is stored for communication toward a decoder.

18 Claims, 11 Drawing Sheets

(56) References Cited

U.S. PATENT DOCUMENTS

| | | | |
|---|---|---|---|
| 2013/0101035 A1* | 4/2013 | Wang | H04N 19/174 |
| | | | 375/E7.243 |
| 2014/0003525 A1 | 1/2014 | Fuldseth | |
| 2015/0201202 A1* | 7/2015 | Hattori | H04N 19/167 |
| | | | 375/240.02 |
| 2017/0289556 A1 | 10/2017 | Hendry et al. | |
| 2017/0318288 A1* | 11/2017 | Wu | H04N 19/167 |
| 2018/0376126 A1* | 12/2018 | Hannuksela | H04N 19/132 |
| 2021/0218962 A1* | 7/2021 | Lim | H04N 19/186 |

FOREIGN PATENT DOCUMENTS

| | | |
|---|---|---|
| EP | 2772055 A1 | 9/2014 |
| WO | 2013063094 A1 | 5/2013 |

OTHER PUBLICATIONS

"Transmission of Non-Telephone Signals; Information Technology—Generic Coding of Moving Pictures and Associated Audio Information: Video," ITU-T Recommendation H.262, Jul. 1995, 211 pages.

"Series H: Audiovisual and Multimedia Systems; Infrastructure of audiovisual services—Coding of moving video; Video coding for low bit rate communication," ITU-T Recommendation H.263, Jan. 2005, 226 pages.

"Series H: Audiovisual and Multimedia Systems; Infrastructure of audiovisual services—Coding of moving video; Advanced video coding for generic audiovisual services," Recommendation ITU-T H.264, Jun. 2019, 836 pages.

"Series H: Audiovisual and Multimedia Systems; Infrastructure of audiovisual services—Coding of moving video; High efficiency video coding" Recommendation ITU-T H.265, Apr. 2013, 317 pages.

Document: JCTVC-AC1005-v2, "HEVC Additional Supplemental Enhancement Information (Draft 4)," Joint Collaborative Team on Video Coding (JCT-VC) of ITU-T SG 16 WP 3 and ISO/IEC JTC 1/SC 29/WG 11, 29th Meeting Macao, CN, Oct. 19-25, 2017, 56 pages.

Document: JVET-L1001-v5, "Versatile Video Coding (Draft 3)," Joint Video Experts Team (JVET) of ITU-T SG 16 WP 3 and ISO/IEC JTC 1/SC 29/WG 11, 12th Meeting: Macao, CN, Oct. 3-12, 2018, 193 pages.

Document: JVET-L0686-v2, "Spec text for the agreed starting point on slicing and tiling," Joint Video Experts Team (JVET) of ITU-T SG 16 WP 3 and ISO/IEC JTC 1/SC 29/WG 11, 2th Meeting: Macao, CN, Oct. 3-12, 2018, 1 page.

Wang, Y.K., et al.; U.S. Appl. No. 62/731,696; Title: "Slicing and Tiling in Video Coding"; Filing Date: Sep. 14, 2019.

Wang, Y., et al.,. "Tile groups," Joint Collaborative Team on Video Coding (JCT-VC) of ITU-T SG16 WP3 and ISO/IEC JTC1/SC29/WG11, 8th Meeting: San Jose, CA, USA, Feb. 1-10, 2012, JCTVC-H0520r1, 8 pages.

Bross, B., et al., "Versatile Video Costing (Draft 2)," hJoint Video Experts Team (JVET) of ITU-T SG 16 WP 3 and ISO/IEC JTC 1/SC29/WG 11,11th Meeting:Ljubljana, SI, Jul. 10-18, 2018, JVET-K1001-v5, 135 pages.

Document: JVET-10374-v2, Deshpande, S., et al., "On Tile Information Signaling for VVC," Joint Video Experts Team (JVET) of ITU-T SG 16 WP 3 and ISO/IEC JTC 1/SC 29/WG 11, 12th Meeting: Macao, CN, Oct. 3-12, 2018, 10 pages.

Document: JVET-L0415-v1, Sjoberg, R., et al., "Tile groups for VVC," Joint Video Experts Team (JVET) of ITU-T SG 16 WP 3 and ISO/IEC JTC 1/SC 29/WG 11, 12th Meeting: Macao, CN, Oct. 3-12, 2018, 6 pages.

Document: JVET-M0121r1, He, Y., et al., "AHG12: On Rectangular Tile Group," Joint Video Experts Team (JVET) of ITU-T SG 16 WP 3 and ISO/IEC JTC 1/SC 29/WG 11, 13th Meeting: Marrakech, MA, Jan. 9-18, 2019, 11 pages.

Document: JVET-M0130-v1, Wang, Y.K. et al., "On tile grouping," Joint Video Experts Team (JVET) of ITU-T SG 16 WP 3 and ISO/IEC JTC 1/SC 29/WG 11, 13th Meeting: Marrakech, MA, Jan. 9-18, 2019, 9 pages.

Document: JVET-L0686-v2, Wang, Y.K., et al., "Spec text for the agreed starting point on slicing and tiling", Joint Video Experts Team (JVET) of ITU-T SG 16 WP 3 and ISO/IEC JTC 1/SC 29/WG 11,12th Meeting: Macao, CN, Oct. 3-12, 2018, 1 page.

Document: JCTVC-H0520r1, Wang, Y.K., et al., "Tile groups", Joint Collaborative Team on Video Coding (JCT-VC) of ITU-T SG16 WP3 and ISO/IEC JTC1/SC29/WG11, 8th Meeting: San Jose, CA, USA, Feb. 1-10, 2012, 8 pages.

* cited by examiner

HARMONIZATION OF RASTER SCAN AND RECTANGULAR TILE GROUPS IN VIDEO CODING

CROSS-REFERENCE TO RELATED APPLICATIONS

This patent application is a continuation of International Application No. PCT/US2019/066884, filed Dec. 17, 2019 by FNU Hendry, et. al., and titled "Harmonization of Raster Scan And Rectangular Tile Groups In Video Coding," which claims the benefit of U.S. Provisional Patent Application No. 62/780,771, filed Dec. 17, 2018 by FNU Hendry, et. al., and titled "Harmonization of Raster-scan and Rectangular Tile Group," and U.S. Provisional Patent Application No. 62/848,149, filed May 15, 2019 by FNU Hendry, et. al., and titled "Harmonization of Raster-scan and Rectangular Tile Group," which are hereby incorporated by reference.

TECHNICAL FIELD

The present disclosure is generally related to video coding, and is specifically related to mechanisms for partitioning images into tile groups to support increased compression in video coding.

BACKGROUND

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in image quality are desirable.

SUMMARY

In an embodiment, the disclosure includes a method implemented in an encoder, the method comprising: partitioning, by a processor of the encoder, a picture into a plurality of tiles; assigning, by the processor, a number of the tiles into a tile group; encoding, by the processor, a flag set to a first value when the tile group is a raster scan tile group and a second value when the tile group is a rectangular tile group, wherein the flag is encoded into a parameter set of a bitstream; encoding, by the processor, the tiles into the bitstream based on the tile group; and storing, in a memory of the encoder, the bitstream for communication toward a decoder. Some video coding systems employ tile groups containing tiles assigned in raster scan order. Other systems employ rectangular tile groups instead in order to support sub-picture extraction in virtual reality (VR), teleconferencing, and other region of interest based coding schemes. Still other systems allow an encoder to select which type of tile group to use depending on the type of video coding application. The present aspects includes a flag which indicates whether the corresponding tile group is raster scan or rectangular. This approach alerts the decoder to the proper tile group coding scheme to support proper decoding. Hence, the disclosed flag allows a encoder/decoder (codec) to support multiple tile group schemes for different use cases, and hence increases the functionality of both the encoder and decoder. Further, signaling the disclosed flag may increase coding efficiency, and hence reduce memory resource usage, processing resource usage, and/or network resource usage at the encoder and/or the decoder.

Optionally, in any of the preceding aspects, another implementation of the aspect provides, wherein the flag is a rectangular tile group flag.

Optionally, in any of the preceding aspects, another implementation of the aspect provides, wherein the parameter set into which the flag is encoded is a sequence parameter set.

Optionally, in any of the preceding aspects, another implementation of the aspect provides, wherein the parameter set into which the flag is encoded is a picture parameter set.

Optionally, in any of the preceding aspects, another implementation of the aspect provides, further comprising encoding in the bitstream, by the processor, an identifier of a first tile of the tile group and an identifier of a last tile of the tile group to indicate the tiles included in the tile group.

Optionally, in any of the preceding aspects, another implementation of the aspect provides, wherein the identifier of the first tile of the tile group and the identifier of the last tile of the tile group are encoded in a tile group header in the bitstream.

Optionally, in any of the preceding aspects, another implementation of the aspect provides, wherein when the tile group is the raster scan tile group, tile inclusion in the tile group is determined by: determining a number of tiles between the first tile of the tile group and the last tile of the tile group as a number of tiles in the tile group; and determining tile inclusion based on the number of tiles in the tile group.

Optionally, in any of the preceding aspects, another implementation of the aspect provides, wherein when the tile group is the rectangular tile group, the tile inclusion in the tile group is determined by: determining a delta value between the first tile of the tile group and the last tile of the tile group; determining a number of tile group rows based on the delta value and a number of tile columns in the picture; determining a number of tile group columns based on the delta value and the number of tile columns in the picture; and determining the tile inclusion based on the number of tile group rows and the number of tile group columns.

In an embodiment, the disclosure includes a method implemented in a decoder, the method comprising: receiving, by a processor of the decoder via a receiver, a bitstream including a picture partitioned into a plurality of tiles, wherein a number of the tiles are included in a tile group; obtaining, by the processor, a flag from a parameter set of the bitstream; determining, by the processor, the tile group is a raster scan tile group when the flag is set to a first value; determining, by the processor, the tile group is a rectangular tile group when the flag is set to a second value; determining, by the processor, tile inclusion for the tile group based on whether the tile group is the raster scan tile group or rectangular tile group; decoding, by the processor, the tiles to generate decoded tiles based on the tile group; and generating, by the processor, a reconstructed video sequence for display based on the decoded tiles. Some video coding systems employ tile groups containing tiles assigned in raster scan order. Other systems employ rectangular tile groups instead in order to support sub-picture extraction in VR, teleconferencing, and other region of interest based coding schemes. Still other systems allow an encoder to select which type of tile group to use depending on the type of video coding application. The present aspects includes a flag which indicates whether the corresponding tile group is raster scan or rectangular. This approach alerts the decoder to the proper tile group coding scheme to support proper decoding. Hence, the disclosed flag allows a codec to support multiple tile group schemes for different use cases, and hence increases the functionality of both the encoder and decoder. Further, signaling the disclosed flag may increase coding efficiency, and hence reduce memory resource usage, processing resource usage, and/or network resource usage at the encoder and/or the decoder.

Optionally, in any of the preceding aspects, another implementation of the aspect provides, wherein the flag is a rectangular tile group flag.

Optionally, in any of the preceding aspects, another implementation of the aspect provides, wherein the parameter set including the flag is a sequence parameter set.

Optionally, in any of the preceding aspects, another implementation of the aspect provides, wherein the parameter set including the flag is a picture parameter set.

Optionally, in any of the preceding aspects, another implementation of the aspect provides, further obtaining, by the processor, an identifier of a first tile of the tile group and an identifier of a last tile of the tile group to determine the tiles included in the tile group.

Optionally, in any of the preceding aspects, another implementation of the aspect provides, wherein the identifier of the first tile of the tile group and the identifier of the last tile of the tile group are obtained from a tile group header in the bitstream.

Optionally, in any of the preceding aspects, another implementation of the aspect provides, wherein when the tile group is the raster scan tile group, tile inclusion in the tile group is determined by: determining a number of tiles between the first tile of the tile group and the last tile of the tile group as a number of tiles in the tile group; and determining tile inclusion based on the number of tiles in the tile group.

Optionally, in any of the preceding aspects, another implementation of the aspect provides, wherein when the tile group is the rectangular tile group, the tile inclusion in the tile group is determined by: determining a delta value between the first tile of the tile group and the last tile of the tile group; determining a number of tile group rows based on the delta value and a number of tile columns in the picture; determining a number of tile group columns based on the delta value and the number of tile columns in the picture; and determining the tile inclusion based on the number of tile group rows and the number of tile group columns.

In an embodiment, the disclosure includes a video coding device comprising: a processor, a receiver coupled to the processor, and a transmitter coupled to the processor, the processor, receiver, and transmitter configured to perform the method of any of any of the preceding aspects.

In an embodiment, the disclosure includes a non-transitory computer readable medium comprising a computer program product for use by a video coding device, the computer program product comprising computer executable instructions stored on the non-transitory computer readable medium such that when executed by a processor cause the video coding device to perform the method of any of any of the preceding aspects.

In an embodiment, the disclosure includes an encoder comprising: a partitioning means for partitioning a picture into a plurality of tiles; an including means for including a number of the tiles into a tile group; an encoding means for: encoding a flag set to a first value when the tile group is a raster scan tile group and a second value when the tile group is a rectangular tile group, wherein the flag is encoded into a parameter set of a bitstream; and encoding the tiles into the bitstream based on tile inclusion; and a storing means for storing the bitstream for communication toward a decoder.

Optionally, in any of the preceding aspects, another implementation of the aspect provides, wherein the encoder is further configured to perform the method of any of any of the preceding aspects.

In an embodiment, the disclosure includes a decoder comprising: a receiving means for receiving a bitstream including a picture partitioned into a plurality of tiles, wherein a number of the tiles are included in a tile group; an obtaining means for obtaining a flag from a parameter set of the bitstream; a determining means for: determining the tile group is a raster scan tile group when the flag is set to a first value; determining the tile group is a rectangular tile group when the flag is set to a second value; and determining tile inclusion for the tile group based on whether the tile group is the raster scan tile group or rectangular tile group; a decoding means for decoding the tiles to generate decoded tiles based on the tile group; and a generating means for generating a reconstructed video sequence for display based on the decoded tiles.

Optionally, in any of the preceding aspects, another implementation of the aspect provides, wherein the decoder is further configured to perform the method of any of the preceding aspects.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
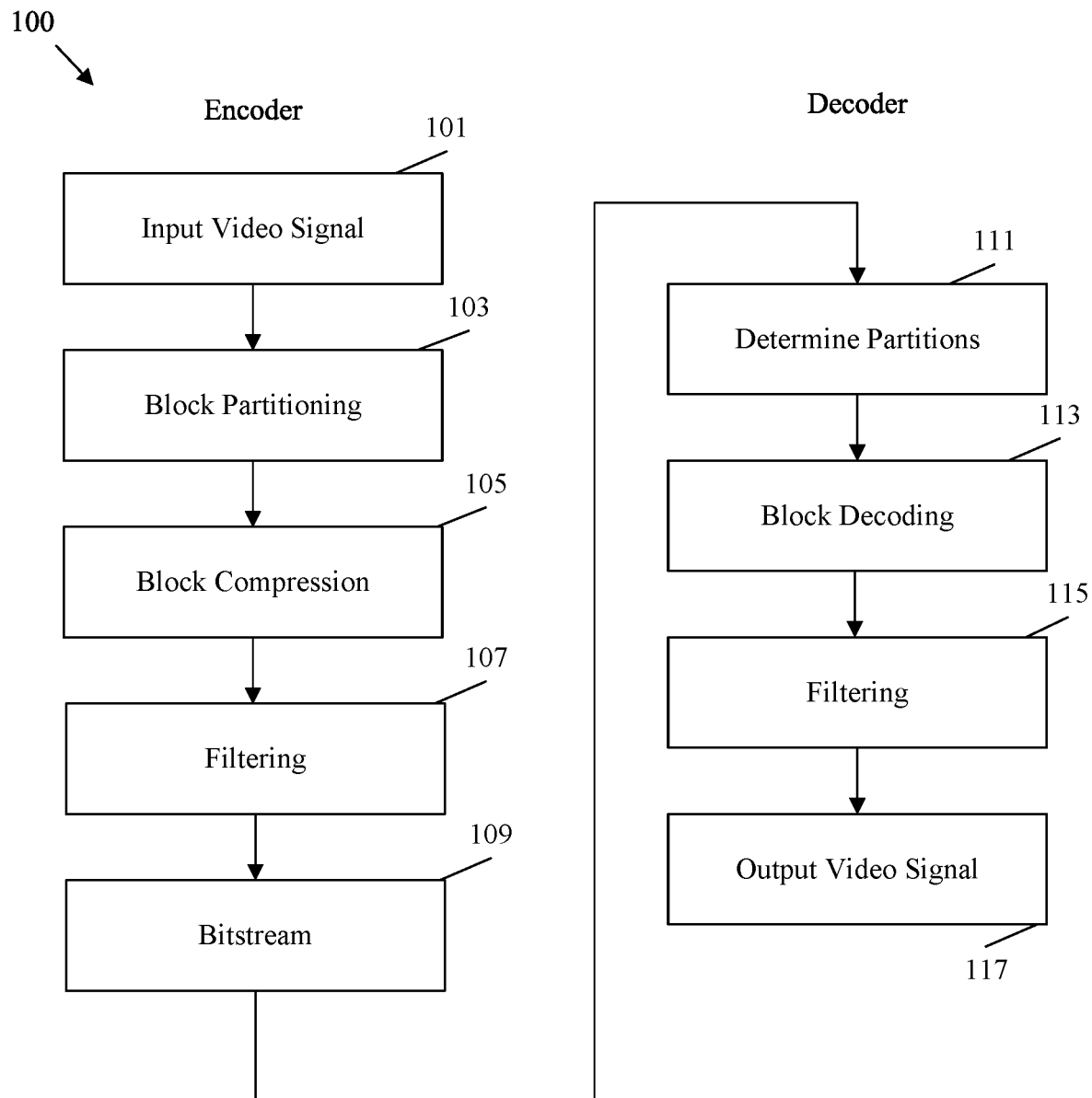
FIG. 1 is a flowchart of an example method of coding a video signal.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Various acronyms are employed herein, such as coding tree block (CTB), coding tree unit (CTU), coding unit (CU), coded video sequence (CVS), Joint Video Experts Team (JVET), motion constrained tile set (MCTS), maximum transfer unit (MTU), network abstraction layer (NAL), picture order count (POC), raw byte sequence payload (RBSP), sequence parameter set (SPS), versatile video coding (VVC), and working draft (WD).

Many video compression techniques can be employed to reduce the size of video files with minimal loss of data. For example, video compression techniques can include performing spatial (e.g., intra-picture) prediction and/or temporal (e.g., inter-picture) prediction to reduce or remove data redundancy in video sequences. For block-based video coding, a video slice (e.g., a video picture or a portion of a video picture) may be partitioned into video blocks, which may also be referred to as treeblocks, coding tree blocks (CTBs), coding tree units (CTUs), coding units (CUs), and/or coding nodes. Video blocks in an intra-coded (I) slice of a picture are coded using spatial prediction with respect to reference samples in neighboring blocks in the same picture. Video blocks in an inter-coded unidirectional prediction (P) or bidirectional prediction (B) slice of a picture may be coded by employing spatial prediction with respect to reference samples in neighboring blocks in the same picture or temporal prediction with respect to reference samples in other reference pictures. Pictures may be referred to as frames and/or images, and reference pictures may be referred to as reference frames and/or reference images. Spatial or temporal prediction results in a predictive block representing an image block. Residual data represents pixel differences between the original image block and the predictive block. Accordingly, an inter-coded block is encoded according to a motion vector that points to a block of reference samples forming the predictive block and the residual data indicating the difference between the coded block and the predictive block. An intra-coded block is encoded according to an intra-coding mode and the residual data. For further compression, the residual data may be transformed from the pixel domain to a transform domain. These result in residual transform coefficients, which may be quantized. The quantized transform coefficients may initially be arranged in a two-dimensional array. The quantized transform coefficients may be scanned in order to produce a one-dimensional vector of transform coefficients. Entropy coding may be applied to achieve even more compression. Such video compression techniques are discussed in greater detail below.

To ensure an encoded video can be accurately decoded, video is encoded and decoded according to corresponding video coding standards. Video coding standards include International Telecommunication Union (ITU) Standardization Sector (ITU-T) H.261, International Organization for Standardization/International Electrotechnical Commission (ISO/IEC) Motion Picture Experts Group (MPEG)-1 Part 2, ITU-T H.262 or ISO/IEC MPEG-2 Part 2, ITU-T H.263, ISO/IEC MPEG-4 Part 2, Advanced Video Coding (AVC), also known as ITU-T H.264 or ISO/IEC MPEG-4 Part 10, and High Efficiency Video Coding (HEVC), also known as ITU-T H.265 or MPEG-H Part 2. AVC includes extensions such as Scalable Video Coding (SVC), Multiview Video Coding (MVC) and Multiview Video Coding plus Depth (MVC+D), and three dimensional (3D) AVC (3D-AVC). HEVC includes extensions such as Scalable HEVC (SHVC), Multiview HEVC (MV-HEVC), and 3D HEVC (3D-HEVC). The joint video experts team (JVET) of ITU-T and ISO/IEC has begun developing a video coding standard referred to as Versatile Video Coding (VVC). VVC is included in a Working Draft (WD), which includes JVET-L1001-v5.

In order to code a video image, the image is first partitioned, and the partitions are coded into a bitstream. Various picture partitioning schemes are available. For example, an image can be partitioned into regular slices, dependent slices, tiles, and/or according to Wavefront Parallel Processing (WPP). For simplicity, HEVC restricts encoders so that only regular slices, dependent slices, tiles, WPP, and combinations thereof can be used when partitioning a slice into groups of CTBs for video coding. Such partitioning can be applied to support Maximum Transfer Unit (MTU) size matching, parallel processing, and reduced end-to-end delay. MTU denotes the maximum amount of data that can be transmitted in a single packet. If a packet payload is in excess of the MTU, that payload is split into two packets through a process called fragmentation.

A regular slice, also referred to simply as a slice, is a partitioned portion of an image that can be reconstructed independently from other regular slices within the same picture, notwithstanding some interdependencies due to loop filtering operations. Each regular slice is encapsulated in its own Network Abstraction Layer (NAL) unit for transmission. Further, in-picture prediction (intra sample prediction, motion information prediction, coding mode prediction) and entropy coding dependency across slice boundaries may be disabled to support independent reconstruction. Such independent reconstruction supports parallelization. For example, regular slice based parallelization employs minimal inter-processor or inter-core communication. However, as each regular slice is independent, each slice is associated with a separate slice header. The use of regular slices can incur a substantial coding overhead due to the bit cost of the slice header for each slice and due to the lack of prediction across the slice boundaries. Further, regular slices may be employed to support matching for MTU size requirements. Specifically, as a regular slice is encapsulated in a separate NAL unit and can be independently coded, each regular slice should be smaller than the MTU in MTU schemes to avoid breaking the slice into multiple packets. As such, the goal of parallelization and the goal of MTU size matching may place contradicting demands to a slice layout in a picture.

Dependent slices are similar to regular slices, but have shortened slice headers and allow partitioning of the image treeblock boundaries without breaking in-picture prediction. Accordingly, dependent slices allow a regular slice to be fragmented into multiple NAL units, which provides reduced end-to-end delay by allowing a part of a regular slice to be sent out before the encoding of the entire regular slice is complete.

A tile is a partitioned portion of an image created by horizontal and vertical boundaries that create columns and rows of tiles. Tiles may be coded in raster scan order (right to left and top to bottom). The scan order of CTBs is local within a tile. Accordingly, CTBs in a first tile are coded in raster scan order, before proceeding to the CTBs in the next tile. Similar to regular slices, tiles break in-picture prediction dependencies as well as entropy decoding dependencies. However, tiles may not be included into individual NAL units, and hence tiles may not be used for MTU size matching. Each tile can be processed by one processor/core, and the inter-processor/inter-core communication employed for in-picture prediction between processing units decoding neighboring tiles may be limited to conveying a shared slice header (when adjacent tiles are in the same slice), and performing loop filtering related sharing of reconstructed samples and metadata. When more than one tile is included in a slice, the entry point byte offset for each tile other than the first entry point offset in the slice may be signaled in the slice header. For each slice and tile, at least one of the following conditions should be fulfilled: 1) all coded treeblocks in a slice belong to the same tile; and 2) all coded treeblocks in a tile belong to the same slice.

In WPP, the image is partitioned into single rows of CTBs. Entropy decoding and prediction mechanisms may use data from CTBs in other rows. Parallel processing is made possible through parallel decoding of CTB rows. For example, a current row may be decoded in parallel with a preceding row. However, decoding of the current row is delayed from the decoding process of the preceding rows by two CTBs. This delay ensures that data related to the CTB above and the CTB above and to the right of the current CTB in the current row is available before the current CTB is coded. This approach appears as a wavefront when represented graphically. This staggered start allows for parallelization with up to as many processors/cores as the image contains CTB rows. Because in-picture prediction between neighboring treeblock rows within a picture is permitted, the inter-processor/inter-core communication to enable in-picture prediction can be substantial. The WPP partitioning does consider NAL unit sizes. Hence, WPP does not support MTU size matching. However, regular slices can be used in conjunction with WPP, with certain coding overhead, to implement MTU size matching as desired.

Tiles may also include motion constrained tile sets. A motion constrained tile set (MCTS) is a tile set designed such that associated motion vectors are restricted to point to full-sample locations inside the MCTS and to fractional-sample locations that require only full-sample locations inside the MCTS for interpolation. Further, the usage of motion vector candidates for temporal motion vector prediction derived from blocks outside the MCTS is disallowed. This way, each MCTS may be independently decoded without the existence of tiles not included in the MCTS. Temporal MCTSs supplemental enhancement information (SEI) messages may be used to indicate the existence of MCTSs in the bitstream and signal the MCTSs. The MCTSs SEI message provides supplemental information that can be used in the MCTS sub-bitstream extraction (specified as part of the semantics of the SEI message) to generate a conforming bitstream for a MCTS. The information includes a number of extraction information sets, each defining a number of MCTSs and containing raw bytes sequence payload (RBSP) bytes of the replacement video parameter sets (VPSs), sequence parameter sets (SPSs), and picture parameter sets (PPSs) to be used during the MCTS sub-bitstream extraction process. When extracting a sub-bitstream according to the MCTS sub-bitstream extraction process, parameter sets (VPSs, SPSs, and PPSs) may be rewritten or replaced, and slice headers may updated because one or all of the slice address related syntax elements (including first_slice_segment_in_pic_flag and slice_segment_address) may employ different values in the extracted sub-bitstream.

The present disclosure is related to various tiling schemes. Specifically, when an image is partitioned into tiles, such tiles can be assigned to tile groups. A tile group is a set of related tiles that can be separately extracted and coded, for example to support display of a region of interest and/or to support parallel processing. Tiles can be assigned to tile groups to allow group wide application of corresponding parameters, functions, coding tools, etc. For example, a tile group may contain a MCTS. As another example, tile groups may be processed and/or extracted separately. Some systems employ a raster scan mechanism to create corresponding tile groups. As used herein, a raster scan tile group is a tile group that is created by assigning tiles in a raster scan order. Raster scan order proceeds continuously from right to left and top to bottom between a first tile and a last tile. Raster scan tile groups may be useful for some applications, for example to support parallel processing.

However, raster scan tile groups may not be efficient in some cases. For example, in virtual reality (VR) applications, an environment is recorded as a sphere encoded into a picture. A user can then experience the environment by viewing a user selected sub-picture of the picture. A user selected sub-picture may be referred to as a region of interest. Allowing the user to selectively perceive a portion of the environment creates the sensation that the user is present in that environment. As such, non-selected portions of the picture may not be viewed and hence discarded. Accordingly, the user selected sub-picture may be treated differently from the non-selected sub-picture (e.g., the non-selected sub-picture may be signaled at lower resolution, may be processed using simpler mechanisms during rendering, etc.) Tile groups allow such differential treatment between sub-pictures. However, the user selected sub-picture is generally a rectangle and/or a square area. Accordingly, raster scan tile groups may not be useful for such use cases.

To overcome these issues, some systems employ rectangular tile groups. A rectangular tile group is a tile group containing a set of tiles that, when taken together, result in a rectangular shape. A rectangular shape, as used herein, is a shape with exactly four sides connected such that each side is connected to two other sides, each at a ninety degree angle. Both tile group approaches (e.g., raster scan tile group and rectangular tile group) may have advantages and disadvantages. Accordingly, video coding systems may wish to support both approaches. However, video coding systems may be unable to efficiently signal tile group usage when both approaches are available. For example, a simple merging of the signaling of these approaches may result in complicated syntax structure that is inefficient and/or processor intensive at the encoder and/or the decoder. The present disclosure presents mechanisms to address these and other issues in the video coding arts.

Disclosed herein are various mechanisms to harmonize the usage of raster scan tile groups and rectangular tile groups by employing simple and compact signaling. Such signaling increases coding efficiency, and hence reduces memory resource usage, processing resource usage, and/or network resource usage at the encoder and/or the decoder. In order to harmonize these approaches, the encoder can signal a flag indicating which type of tile group is employed. For example, the flag may be a rectangular tile group flag, which may be signaled in a parameter set, such as a SPS and/or a PPS. The flag can indicate whether the encoder is using raster scan tile groups or rectangular tile groups. The encoder can then indicate tile group membership by simply signaling the first and last tile in the tile group. Based on the first tile, the last tile, and the indication of the tile group type, the decoder can determine which tiles are included in a tile group. Accordingly, a full list of all tiles in each tile group may be omitted from the bitstream, which increases coding efficiency. For example, if the tile group is a raster scan tile group, the tiles assigned to the tile group can be determined by determining a number of tiles between the first tile and the last tile of the tile group, and adding that many tiles, with identifiers between the first tile and last tile, to the tile group. If the tile group is a rectangular tile group, a different approach can be used. For example, a delta value can be determined between the first tile and the last tile of the tile group. A number of tile group rows and a number of tile group columns can then be determined based on the delta value and the number of tile columns in the picture. The tiles in the tile group can then be determined based on the number of tile group rows and the number of tile group columns. These and other examples are described in detail below.

FIG. 1 is a flowchart of an example operating method 100 of coding a video signal. Specifically, a video signal is encoded at an encoder. The encoding process compresses the video signal by employing various mechanisms to reduce the video file size. A smaller file size allows the compressed video file to be transmitted toward a user, while reducing associated bandwidth overhead. The decoder then decodes the compressed video file to reconstruct the original video signal for display to an end user. The decoding process generally mirrors the encoding process to allow the decoder to consistently reconstruct the video signal.

At step 101, the video signal is input into the encoder. For example, the video signal may be an uncompressed video file stored in memory. As another example, the video file may be captured by a video capture device, such as a video camera, and encoded to support live streaming of the video. The video file may include both an audio component and a video component. The video component contains a series of image frames that, when viewed in a sequence, gives the visual impression of motion. The frames contain pixels that are expressed in terms of light, referred to herein as luma components (or luma samples), and color, which is referred to as chroma components (or color samples). In some examples, the frames may also contain depth values to support three dimensional viewing.

At step 103, the video is partitioned into blocks. Partitioning includes subdividing the pixels in each frame into square and/or rectangular blocks for compression. For example, in High Efficiency Video Coding (HEVC) (also known as H.265 and MPEG-H Part 2) the frame can first be divided into coding tree units (CTUs), which are blocks of a predefined size (e.g., sixty-four pixels by sixty-four pixels). The CTUs contain both luma and chroma samples. Coding trees may be employed to divide the CTUs into blocks and then recursively subdivide the blocks until configurations are achieved that support further encoding. For example, luma components of a frame may be subdivided until the individual blocks contain relatively homogenous lighting values. Further, chroma components of a frame may be subdivided until the individual blocks contain relatively homogenous color values. Accordingly, partitioning mechanisms vary depending on the content of the video frames.

At step 105, various compression mechanisms are employed to compress the image blocks partitioned at step 103. For example, inter-prediction and/or intra-prediction may be employed. Inter-prediction is designed to take advantage of the fact that objects in a common scene tend to appear in successive frames. Accordingly, a block depicting an object in a reference frame need not be repeatedly described in adjacent frames. Specifically, an object, such as a table, may remain in a constant position over multiple frames. Hence the table is described once and adjacent frames can refer back to the reference frame. Pattern matching mechanisms may be employed to match objects over multiple frames. Further, moving objects may be represented across multiple frames, for example due to object movement or camera movement. As a particular example, a video may show an automobile that moves across the screen over multiple frames. Motion vectors can be employed to describe such movement. A motion vector is a two-dimensional vector that provides an offset from the coordinates of an object in a frame to the coordinates of the object in a reference frame. As such, inter-prediction can encode an image block in a current frame as a set of motion vectors indicating an offset from a corresponding block in a reference frame.

Intra-prediction encodes blocks in a common frame. Intra-prediction takes advantage of the fact that luma and chroma components tend to cluster in a frame. For example, a patch of green in a portion of a tree tends to be positioned adjacent to similar patches of green. Intra-prediction employs multiple directional prediction modes (e.g., thirty-three in HEVC), a planar mode, and a direct current (DC) mode. The directional modes indicate that a current block is similar/the same as samples of a neighbor block in a corresponding direction. Planar mode indicates that a series of blocks along a row/column (e.g., a plane) can be interpolated based on neighbor blocks at the edges of the row. Planar mode, in effect, indicates a smooth transition of light/color across a row/column by employing a relatively constant slope in changing values. DC mode is employed for boundary smoothing and indicates that a block is similar/the same as an average value associated with samples of all the neighbor blocks associated with the angular directions of the directional prediction modes. Accordingly, intra-prediction blocks can represent image blocks as various relational prediction mode values instead of the actual values. Further, inter-prediction blocks can represent image blocks as motion vector values instead of the actual values. In either case, the prediction blocks may not exactly represent the image blocks in some cases. Any differences are stored in residual blocks. Transforms may be applied to the residual blocks to further compress the file.

At step 107, various filtering techniques may be applied. In HEVC, the filters are applied according to an in-loop filtering scheme. The block based prediction discussed above may result in the creation of blocky images at the decoder. Further, the block based prediction scheme may encode a block and then reconstruct the encoded block for later use as a reference block. The in-loop filtering scheme iteratively applies noise suppression filters, de-blocking filters, adaptive loop filters, and sample adaptive offset (SAO) filters to the blocks/frames. These filters mitigate such blocking artifacts so that the encoded file can be accurately reconstructed. Further, these filters mitigate artifacts in the reconstructed reference blocks so that artifacts are less likely to create additional artifacts in subsequent blocks that are encoded based on the reconstructed reference blocks.

Once the video signal has been partitioned, compressed, and filtered, the resulting data is encoded in a bitstream at step 109. The bitstream includes the data discussed above as well as any signaling data desired to support proper video signal reconstruction at the decoder. For example, such data may include partition data, prediction data, residual blocks, and various flags providing coding instructions to the decoder. The bitstream may be stored in memory for transmission toward a decoder upon request. The bitstream may also be broadcast and/or multicast toward a plurality of decoders. The creation of the bitstream is an iterative process. Accordingly, steps 101, 103, 105, 107, and 109 may occur continuously and/or simultaneously over many frames and blocks. The order shown in FIG. 1 is presented for clarity and ease of discussion, and is not intended to limit the video coding process to a particular order.

The decoder receives the bitstream and begins the decoding process at step 111. Specifically, the decoder employs an entropy decoding scheme to convert the bitstream into corresponding syntax and video data. The decoder employs the syntax data from the bitstream to determine the partitions for the frames at step 111. The partitioning should match the results of block partitioning at step 103. Entropy encoding/decoding as employed in step 111 is now described. The encoder makes many choices during the compression process, such as selecting block partitioning schemes from several possible choices based on the spatial positioning of values in the input image(s). Signaling the exact choices may employ a large number of bins. As used herein, a bin is a binary value that is treated as a variable (e.g., a bit value that may vary depending on context). Entropy coding allows the encoder to discard any options that are clearly not viable for a particular case, leaving a set of allowable options. Each allowable option is then assigned a code word. The length of the code words is based on the number of allowable options (e.g., one bin for two options, two bins for three to four options, etc.) The encoder then encodes the code word for the selected option. This scheme reduces the size of the code words as the code words are as big as desired to uniquely indicate a selection from a small sub-set of allowable options as opposed to uniquely indicating the selection from a potentially large set of all possible options. The decoder then decodes the selection by determining the set of allowable options in a similar manner to the encoder. By determining the set of allowable options, the decoder can read the code word and determine the selection made by the encoder.

At step 113, the decoder performs block decoding. Specifically, the decoder employs reverse transforms to generate residual blocks. Then the decoder employs the residual blocks and corresponding prediction blocks to reconstruct the image blocks according to the partitioning. The prediction blocks may include both intra-prediction blocks and inter-prediction blocks as generated at the encoder at step 105. The reconstructed image blocks are then positioned into frames of a reconstructed video signal according to the partitioning data determined at step 111. Syntax for step 113 may also be signaled in the bitstream via entropy coding as discussed above.

At step 115, filtering is performed on the frames of the reconstructed video signal in a manner similar to step 107 at the encoder. For example, noise suppression filters, deblocking filters, adaptive loop filters, and SAO filters may be applied to the frames to remove blocking artifacts. Once the frames are filtered, the video signal can be output to a display at step 117 for viewing by an end user.

Figure 2:
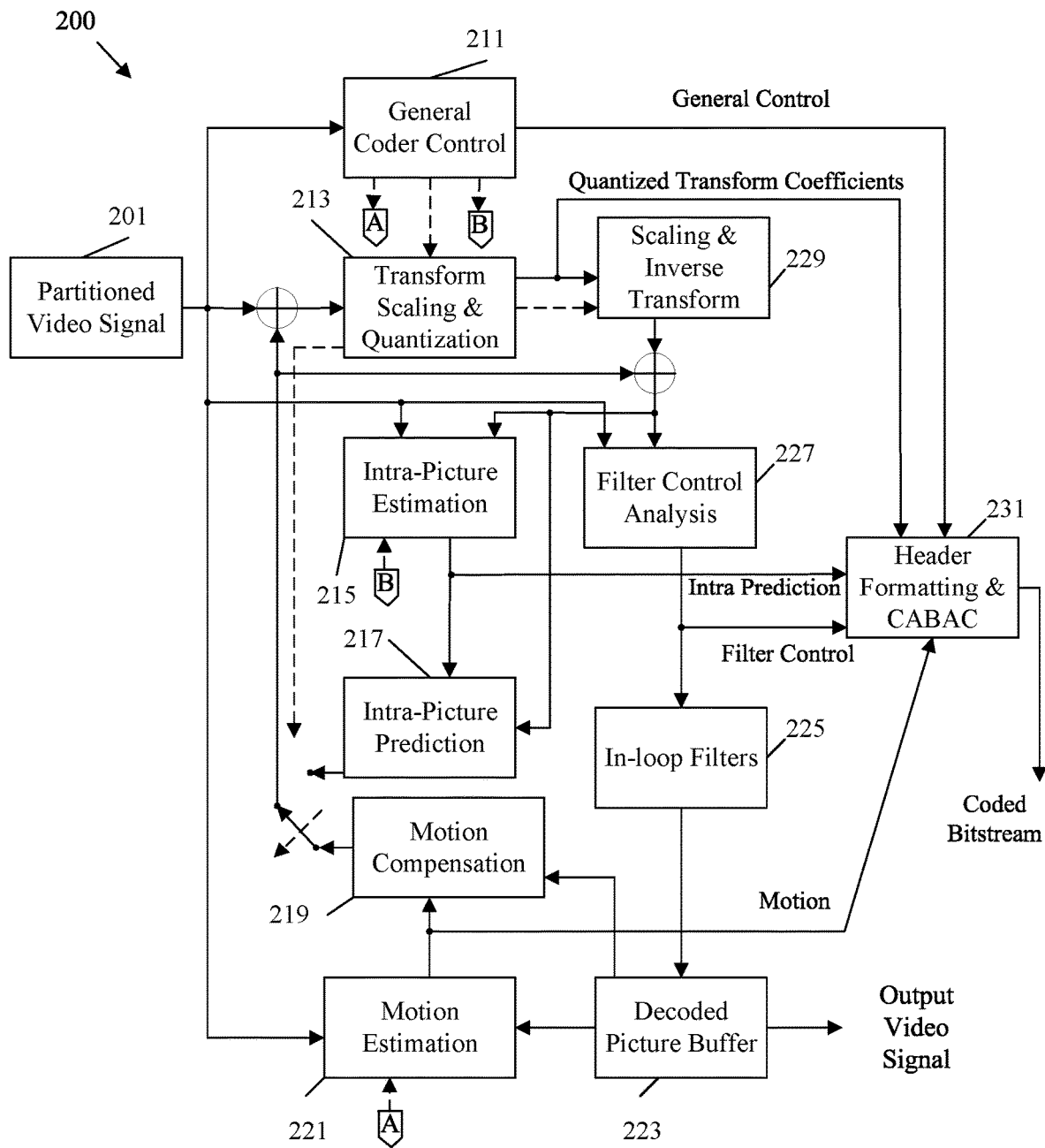
FIG. 2 is a schematic diagram of an example coding and decoding (codec) system for video coding.

FIG. 2 is a schematic diagram of an example coding and decoding (codec) system 200 for video coding. Specifically, codec system 200 provides functionality to support the implementation of operating method 100. Codec system 200 is generalized to depict components employed in both an encoder and a decoder. Codec system 200 receives and partitions a video signal as discussed with respect to steps 101 and 103 in operating method 100, which results in a partitioned video signal 201. Codec system 200 then compresses the partitioned video signal 201 into a coded bitstream when acting as an encoder as discussed with respect to steps 105, 107, and 109 in method 100. When acting as a decoder codec system 200 generates an output video signal from the bitstream as discussed with respect to steps 111, 113, 115, and 117 in operating method 100. The codec system 200 includes a general coder control component 211, a transform scaling and quantization component 213, an intra-picture estimation component 215, an intra-picture prediction component 217, a motion compensation component 219, a motion estimation component 221, a scaling and inverse transform component 229, a filter control analysis component 227, an in-loop filters component 225, a decoded picture buffer component 223, and a header formatting and context adaptive binary arithmetic coding (CABAC) component 231. Such components are coupled as shown. In FIG. 2, black lines indicate movement of data to be encoded/decoded while dashed lines indicate movement of control data that controls the operation of other components. The components of codec system 200 may all be present in the encoder. The decoder may include a subset of the components of codec system 200. For example, the decoder may include the intra-picture prediction component 217, the motion compensation component 219, the scaling and inverse transform component 229, the in-loop filters component 225, and the decoded picture buffer component 223. These components are now described.

The partitioned video signal 201 is a captured video sequence that has been partitioned into blocks of pixels by a coding tree. A coding tree employs various split modes to subdivide a block of pixels into smaller blocks of pixels. These blocks can then be further subdivided into smaller blocks. The blocks may be referred to as nodes on the coding tree. Larger parent nodes are split into smaller child nodes. The number of times a node is subdivided is referred to as the depth of the node/coding tree. The divided blocks can be included in coding units (CUs) in some cases. For example, a CU can be a sub-portion of a CTU that contains a luma block, red difference chroma (Cr) block(s), and a blue difference chroma (Cb) block(s) along with corresponding syntax instructions for the CU. The split modes may include a binary tree (BT), triple tree (TT), and a quad tree (QT) employed to partition a node into two, three, or four child nodes, respectively, of varying shapes depending on the split modes employed. The partitioned video signal 201 is forwarded to the general coder control component 211, the transform scaling and quantization component 213, the intra-picture estimation component 215, the filter control analysis component 227, and the motion estimation component 221 for compression.

The general coder control component 211 is configured to make decisions related to coding of the images of the video sequence into the bitstream according to application constraints. For example, the general coder control component 211 manages optimization of bitrate/bitstream size versus reconstruction quality. Such decisions may be made based on storage space/bandwidth availability and image resolution requests. The general coder control component 211 also manages buffer utilization in light of transmission speed to mitigate buffer underrun and overrun issues. To manage these issues, the general coder control component 211 manages partitioning, prediction, and filtering by the other components. For example, the general coder control component 211 may dynamically increase compression complexity to increase resolution and increase bandwidth usage or decrease compression complexity to decrease resolution and bandwidth usage. Hence, the general coder control component 211 controls the other components of codec system 200 to balance video signal reconstruction quality with bit rate concerns. The general coder control component 211 creates control data, which controls the operation of the other components. The control data is also forwarded to the header formatting and CABAC component 231 to be encoded in the bitstream to signal parameters for decoding at the decoder.

The partitioned video signal 201 is also sent to the motion estimation component 221 and the motion compensation component 219 for inter-prediction. A frame or slice of the partitioned video signal 201 may be divided into multiple video blocks. Motion estimation component 221 and the motion compensation component 219 perform inter-predictive coding of the received video block relative to one or more blocks in one or more reference frames to provide temporal prediction. Codec system 200 may perform multiple coding passes, e.g., to select an appropriate coding mode for each block of video data.

Motion estimation component 221 and motion compensation component 219 may be highly integrated, but are illustrated separately for conceptual purposes. Motion estimation, performed by motion estimation component 221, is the process of generating motion vectors, which estimate motion for video blocks. A motion vector, for example, may indicate the displacement of a coded object relative to a predictive block. A predictive block is a block that is found to closely match the block to be coded, in terms of pixel difference. A predictive block may also be referred to as a reference block. Such pixel difference may be determined by sum of absolute difference (SAD), sum of square difference (SSD), or other difference metrics. HEVC employs several coded objects including a CTU, coding tree blocks (CTBs), and CUs. For example, a CTU can be divided into CTBs, which can then be divided into CBs for inclusion in CUs. A CU can be encoded as a prediction unit (PU) containing prediction data and/or a transform unit (TU) containing transformed residual data for the CU. The motion estimation component 221 generates motion vectors, PUs, and TUs by using a rate-distortion analysis as part of a rate distortion optimization process. For example, the motion estimation component 221 may determine multiple reference blocks, multiple motion vectors, etc. for a current block/frame, and may select the reference blocks, motion vectors, etc. having the best rate-distortion characteristics. The best rate-distortion characteristics balance both quality of video reconstruction (e.g., amount of data loss by compression) with coding efficiency (e.g., size of the final encoding).

In some examples, codec system 200 may calculate values for sub-integer pixel positions of reference pictures stored in decoded picture buffer component 223. For example, video codec system 200 may interpolate values of one-quarter pixel positions, one-eighth pixel positions, or other fractional pixel positions of the reference picture. Therefore, motion estimation component 221 may perform a motion search relative to the full pixel positions and fractional pixel positions and output a motion vector with fractional pixel precision. The motion estimation component 221 calculates a motion vector for a PU of a video block in an inter-coded slice by comparing the position of the PU to the position of a predictive block of a reference picture. Motion estimation component 221 outputs the calculated motion vector as motion data to header formatting and CABAC component 231 for encoding and motion to the motion compensation component 219.

Motion compensation, performed by motion compensation component 219, may involve fetching or generating the predictive block based on the motion vector determined by motion estimation component 221. Again, motion estimation component 221 and motion compensation component 219 may be functionally integrated, in some examples. Upon receiving the motion vector for the PU of the current video block, motion compensation component 219 may locate the predictive block to which the motion vector points. A residual video block is then formed by subtracting pixel values of the predictive block from the pixel values of the current video block being coded, forming pixel difference values. In general, motion estimation component 221 performs motion estimation relative to luma components, and motion compensation component 219 uses motion vectors calculated based on the luma components for both chroma components and luma components. The predictive block and residual block are forwarded to transform scaling and quantization component 213.

The partitioned video signal 201 is also sent to intra-picture estimation component 215 and intra-picture prediction component 217. As with motion estimation component 221 and motion compensation component 219, intra-picture estimation component 215 and intra-picture prediction component 217 may be highly integrated, but are illustrated separately for conceptual purposes. The intra-picture estimation component 215 and intra-picture prediction component 217 intra-predict a current block relative to blocks in a current frame, as an alternative to the inter-prediction performed by motion estimation component 221 and motion compensation component 219 between frames, as described above. In particular, the intra-picture estimation component 215 determines an intra-prediction mode to use to encode a current block. In some examples, intra-picture estimation component 215 selects an appropriate intra-prediction mode to encode a current block from multiple tested intra-prediction modes. The selected intra-prediction modes are then forwarded to the header formatting and CABAC component 231 for encoding.

For example, the intra-picture estimation component 215 calculates rate-distortion values using a rate-distortion analysis for the various tested intra-prediction modes, and selects the intra-prediction mode having the best rate-distortion characteristics among the tested modes. Rate-distortion analysis generally determines an amount of distortion (or error) between an encoded block and an original uncoded block that was encoded to produce the encoded block, as well as a bitrate (e.g., a number of bits) used to produce the encoded block. The intra-picture estimation component 215 calculates ratios from the distortions and rates for the various encoded blocks to determine which intra-prediction mode exhibits the best rate-distortion value for the block. In addition, intra-picture estimation component 215 may be configured to code depth blocks of a depth map using a depth modeling mode (DMM) based on rate-distortion optimization (RDO).

The intra-picture prediction component 217 may generate a residual block from the predictive block based on the selected intra-prediction modes determined by intra-picture estimation component 215 when implemented on an encoder or read the residual block from the bitstream when implemented on a decoder. The residual block includes the difference in values between the predictive block and the original block, represented as a matrix. The residual block is then forwarded to the transform scaling and quantization component 213. The intra-picture estimation component 215 and the intra-picture prediction component 217 may operate on both luma and chroma components.

The transform scaling and quantization component 213 is configured to further compress the residual block. The transform scaling and quantization component 213 applies a transform, such as a discrete cosine transform (DCT), a discrete sine transform (DST), or a conceptually similar transform, to the residual block, producing a video block comprising residual transform coefficient values. Wavelet transforms, integer transforms, sub-band transforms or other types of transforms could also be used. The transform may convert the residual information from a pixel value domain to a transform domain, such as a frequency domain. The transform scaling and quantization component 213 is also configured to scale the transformed residual information, for example based on frequency. Such scaling involves applying a scale factor to the residual information so that different frequency information is quantized at different granularities, which may affect final visual quality of the reconstructed video. The transform scaling and quantization component 213 is also configured to quantize the transform coefficients to further reduce bit rate. The quantization process may reduce the bit depth associated with some or all of the coefficients. The degree of quantization may be modified by adjusting a quantization parameter. In some examples, the transform scaling and quantization component 213 may then perform a scan of the matrix including the quantized transform coefficients. The quantized transform coefficients are forwarded to the header formatting and CABAC component 231 to be encoded in the bitstream.

The scaling and inverse transform component 229 applies a reverse operation of the transform scaling and quantization component 213 to support motion estimation. The scaling and inverse transform component 229 applies inverse scaling, transformation, and/or quantization to reconstruct the residual block in the pixel domain, e.g., for later use as a reference block which may become a predictive block for another current block. The motion estimation component 221 and/or motion compensation component 219 may calculate a reference block by adding the residual block back to a corresponding predictive block for use in motion estimation of a later block/frame. Filters are applied to the reconstructed reference blocks to mitigate artifacts created during scaling, quantization, and transform. Such artifacts could otherwise cause inaccurate prediction (and create additional artifacts) when subsequent blocks are predicted.

The filter control analysis component 227 and the in-loop filters component 225 apply the filters to the residual blocks and/or to reconstructed image blocks. For example, the transformed residual block from the scaling and inverse transform component 229 may be combined with a corresponding prediction block from intra-picture prediction component 217 and/or motion compensation component 219 to reconstruct the original image block. The filters may then be applied to the reconstructed image block. In some examples, the filters may instead be applied to the residual blocks. As with other components in FIG. 2, the filter control analysis component 227 and the in-loop filters component 225 are highly integrated and may be implemented together, but are depicted separately for conceptual purposes. Filters applied to the reconstructed reference blocks are applied to particular spatial regions and include multiple parameters to adjust how such filters are applied. The filter control analysis component 227 analyzes the reconstructed reference blocks to determine where such filters should be applied and sets corresponding parameters. Such data is forwarded to the header formatting and CABAC component 231 as filter control data for encoding. The in-loop filters component 225 applies such filters based on the filter control data. The filters may include a deblocking filter, a noise suppression filter, a SAO filter, and an adaptive loop filter. Such filters may be applied in the spatial/pixel domain (e.g., on a reconstructed pixel block) or in the frequency domain, depending on the example.

When operating as an encoder, the filtered reconstructed image block, residual block, and/or prediction block are stored in the decoded picture buffer component 223 for later use in motion estimation as discussed above. When operating as a decoder, the decoded picture buffer component 223 stores and forwards the reconstructed and filtered blocks toward a display as part of an output video signal. The decoded picture buffer component 223 may be any memory device capable of storing prediction blocks, residual blocks, and/or reconstructed image blocks.

The header formatting and CABAC component 231 receives the data from the various components of codec system 200 and encodes such data into a coded bitstream for transmission toward a decoder. Specifically, the header formatting and CABAC component 231 generates various headers to encode control data, such as general control data and filter control data. Further, prediction data, including intra-prediction and motion data, as well as residual data in the form of quantized transform coefficient data are all encoded in the bitstream. The final bitstream includes all information desired by the decoder to reconstruct the original partitioned video signal 201. Such information may also include intra-prediction mode index tables (also referred to as codeword mapping tables), definitions of encoding contexts for various blocks, indications of most probable intra-prediction modes, an indication of partition information, etc. Such data may be encoded by employing entropy coding. For example, the information may be encoded by employing context adaptive variable length coding (CAVLC), CABAC, syntax-based context-adaptive binary arithmetic coding (SBAC), probability interval partitioning entropy (PIPE) coding, or another entropy coding technique. Following the entropy coding, the coded bitstream may be transmitted to another device (e.g., a video decoder) or archived for later transmission or retrieval.

Figure 3:
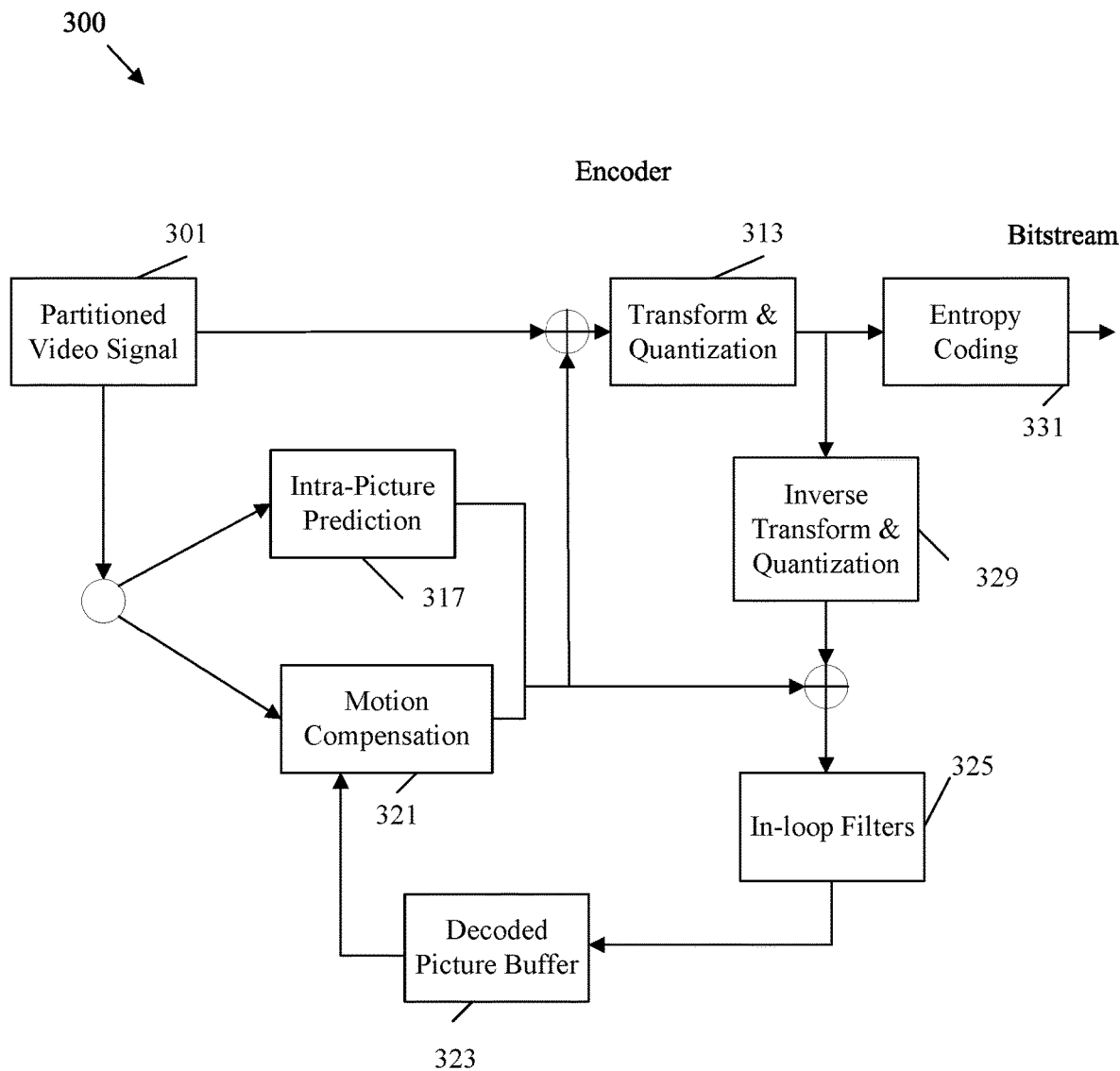
FIG. 3 is a schematic diagram illustrating an example video encoder.

FIG. 3 is a block diagram illustrating an example video encoder 300. Video encoder 300 may be employed to implement the encoding functions of codec system 200 and/or implement steps 101, 103, 105, 107, and/or 109 of operating method 100. Encoder 300 partitions an input video signal, resulting in a partitioned video signal 301, which is substantially similar to the partitioned video signal 201. The partitioned video signal 301 is then compressed and encoded into a bitstream by components of encoder 300.

Specifically, the partitioned video signal 301 is forwarded to an intra-picture prediction component 317 for intra-prediction. The intra-picture prediction component 317 may be substantially similar to intra-picture estimation component 215 and intra-picture prediction component 217. The partitioned video signal 301 is also forwarded to a motion compensation component 321 for inter-prediction based on reference blocks in a decoded picture buffer component 323.

The motion compensation component 321 may be substantially similar to motion estimation component 221 and motion compensation component 219. The prediction blocks and residual blocks from the intra-picture prediction component 317 and the motion compensation component 321 are forwarded to a transform and quantization component 313 for transform and quantization of the residual blocks. The transform and quantization component 313 may be substantially similar to the transform scaling and quantization component 213. The transformed and quantized residual blocks and the corresponding prediction blocks (along with associated control data) are forwarded to an entropy coding component 331 for coding into a bitstream. The entropy coding component 331 may be substantially similar to the header formatting and CABAC component 231.

The transformed and quantized residual blocks and/or the corresponding prediction blocks are also forwarded from the transform and quantization component 313 to an inverse transform and quantization component 329 for reconstruction into reference blocks for use by the motion compensation component 321. The inverse transform and quantization component 329 may be substantially similar to the scaling and inverse transform component 229. In-loop filters in an in-loop filters component 325 are also applied to the residual blocks and/or reconstructed reference blocks, depending on the example. The in-loop filters component 325 may be substantially similar to the filter control analysis component 227 and the in-loop filters component 225. The in-loop filters component 325 may include multiple filters as discussed with respect to in-loop filters component 225. The filtered blocks are then stored in a decoded picture buffer component 323 for use as reference blocks by the motion compensation component 321. The decoded picture buffer component 323 may be substantially similar to the decoded picture buffer component 223.

Figure 4:
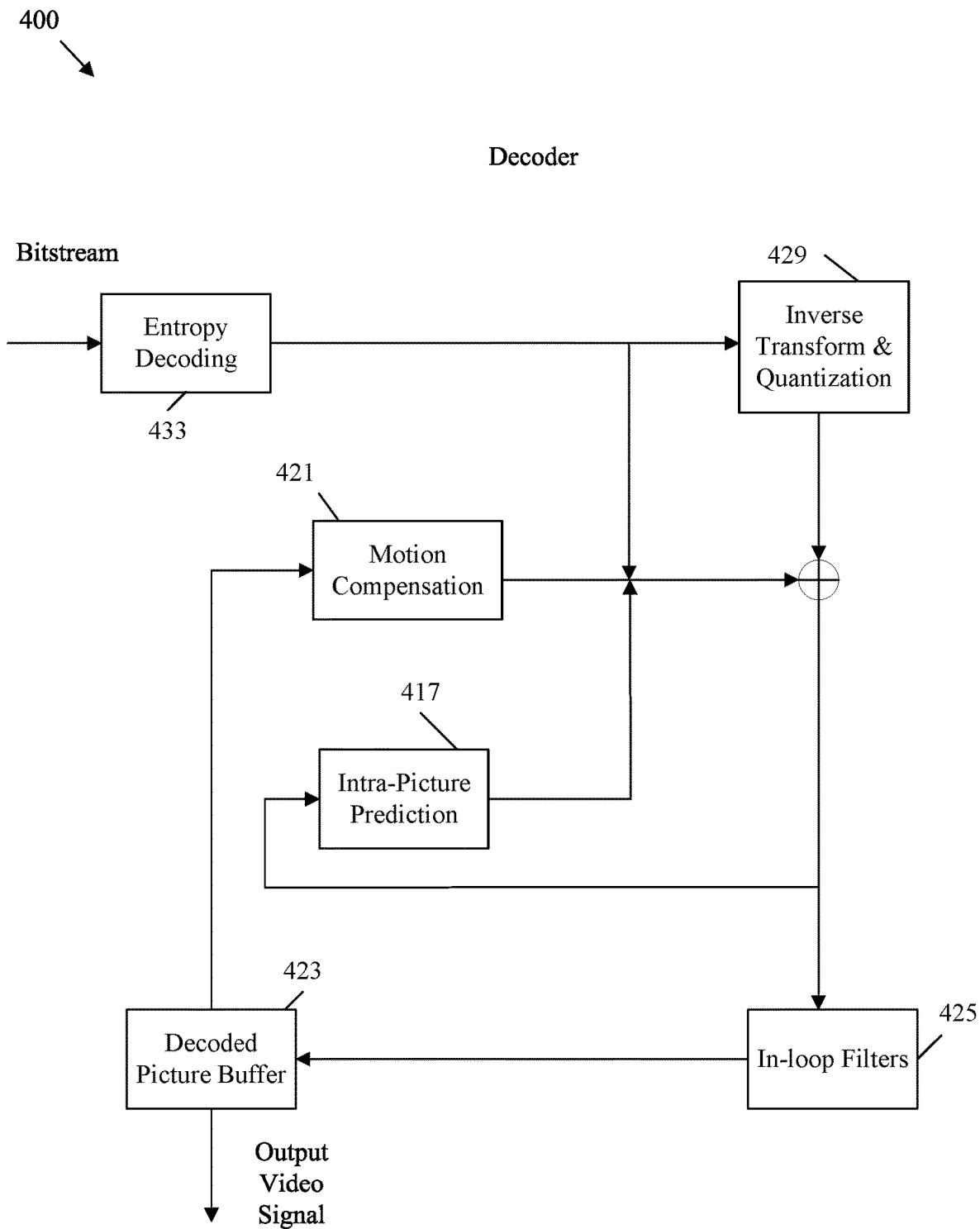
FIG. 4 is a schematic diagram illustrating an example video decoder.

FIG. 4 is a block diagram illustrating an example video decoder 400. Video decoder 400 may be employed to implement the decoding functions of codec system 200 and/or implement steps 111, 113, 115, and/or 117 of operating method 100. Decoder 400 receives a bitstream, for example from an encoder 300, and generates a reconstructed output video signal based on the bitstream for display to an end user.

The bitstream is received by an entropy decoding component 433. The entropy decoding component 433 is configured to implement an entropy decoding scheme, such as CAVLC, CABAC, SBAC, PIPE coding, or other entropy coding techniques. For example, the entropy decoding component 433 may employ header information to provide a context to interpret additional data encoded as codewords in the bitstream. The decoded information includes any desired information to decode the video signal, such as general control data, filter control data, partition information, motion data, prediction data, and quantized transform coefficients from residual blocks. The quantized transform coefficients are forwarded to an inverse transform and quantization component 429 for reconstruction into residual blocks. The inverse transform and quantization component 429 may be similar to inverse transform and quantization component 329.

The reconstructed residual blocks and/or prediction blocks are forwarded to intra-picture prediction component 417 for reconstruction into image blocks based on intra-prediction operations. The intra-picture prediction component 417 may be similar to intra-picture estimation component 215 and an intra-picture prediction component 217. Specifically, the intra-picture prediction component 417 employs prediction modes to locate a reference block in the frame and applies a residual block to the result to reconstruct intra-predicted image blocks. The reconstructed intra-predicted image blocks and/or the residual blocks and corresponding inter-prediction data are forwarded to a decoded picture buffer component 423 via an in-loop filters component 425, which may be substantially similar to decoded picture buffer component 223 and in-loop filters component 225, respectively. The in-loop filters component 425 filters the reconstructed image blocks, residual blocks and/or prediction blocks, and such information is stored in the decoded picture buffer component 423. Reconstructed image blocks from decoded picture buffer component 423 are forwarded to a motion compensation component 421 for inter-prediction. The motion compensation component 421 may be substantially similar to motion estimation component 221 and/or motion compensation component 219. Specifically, the motion compensation component 421 employs motion vectors from a reference block to generate a prediction block and applies a residual block to the result to reconstruct an image block. The resulting reconstructed blocks may also be forwarded via the in-loop filters component 425 to the decoded picture buffer component 423. The decoded picture buffer component 423 continues to store additional reconstructed image blocks, which can be reconstructed into frames via the partition information. Such frames may also be placed in a sequence. The sequence is output toward a display as a reconstructed output video signal.

Figure 5:
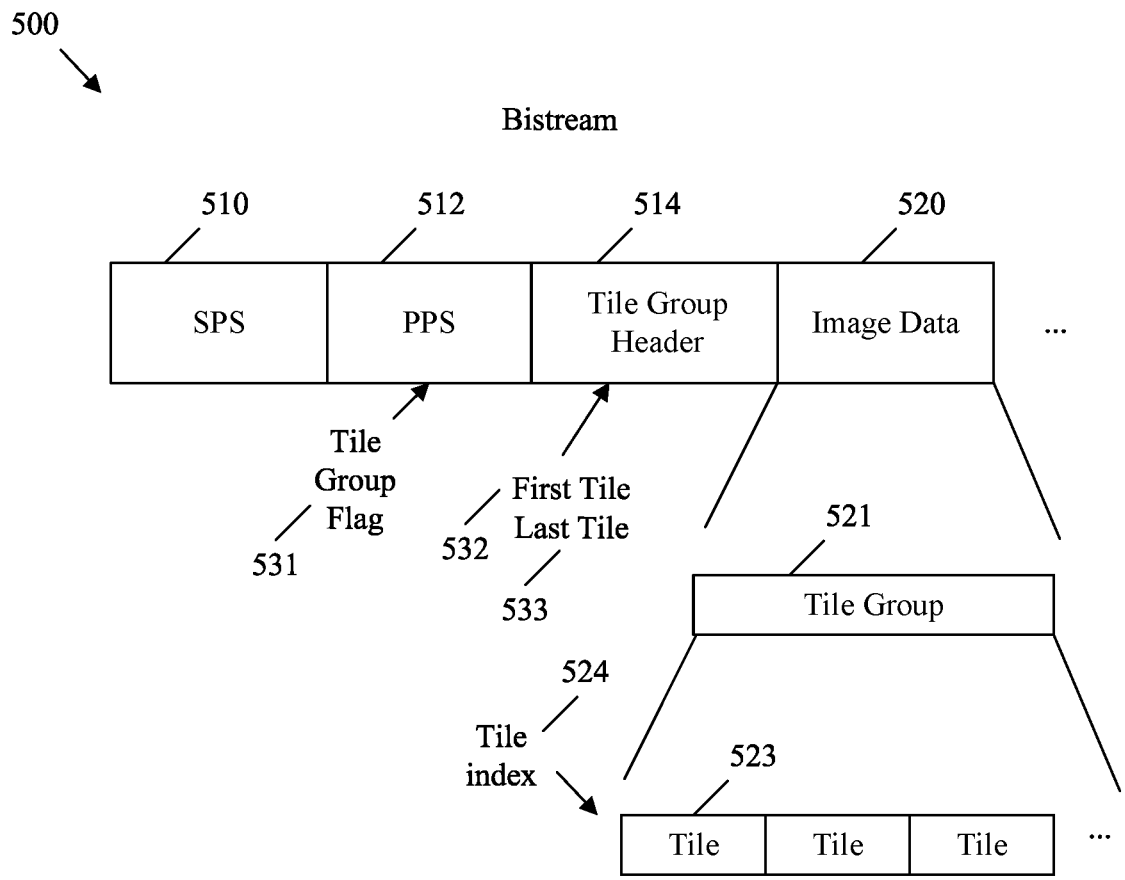
FIG. 5 is a schematic diagram illustrating an example bitstream containing an encoded video sequence.

FIG. 5 is a schematic diagram illustrating an example bitstream 500 containing an encoded video sequence. For example, the bitstream 500 can be generated by a codec system 200 and/or an encoder 300 for decoding by a codec system 200 and/or a decoder 400. As another example, the bitstream 500 may be generated by an encoder at step 109 of method 100 for use by a decoder at step 111.

The bitstream 500 includes a sequence parameter set (SPS) 510, a plurality of picture parameter sets (PPSs) 512, tile group headers 514, and image data 520. An SPS 510 contains sequence data common to all the pictures in the video sequence contained in the bitstream 500. Such data can include picture sizing, bit depth, coding tool parameters, bit rate restrictions, etc. The PPS 512 contains parameters that are specific to one or more corresponding pictures. Hence, each picture in a video sequence may refer to one PPS 512. The PPS 512 can indicate coding tools available for tiles in corresponding pictures, quantization parameters, offsets, picture specific coding tool parameters (e.g., filter controls), etc. The tile group header 514 contains parameters that are specific to each tile group in a picture. Hence, there may be one tile group header 514 per tile group in the video sequence. The tile group header 514 may contain tile group information, picture order counts (POCs), reference picture lists, prediction weights, tile entry points, deblocking parameters, etc. It should be noted that some systems refer to the tile group header 514 as a slice header, and use such information to support slices instead of tile groups.

The image data 520 contains video data encoded according to inter-prediction and/or intra-prediction as well as corresponding transformed and quantized residual data. Such image data 520 is sorted according to the partitioning used to partition the image prior to encoding. For example, the image in the image data 520 is divided into one or more tile groups 521. Each tile group 521 contains one or more tiles 523. The tiles 523 are further divided into coding tree units (CTUs). The CTUs are further divided into coding blocks based on coding trees. The coding blocks can then be encoded/decoded according to prediction mechanisms. An image/picture can contain one or more tile groups 521 and one or more tiles 523.

Figure 6:
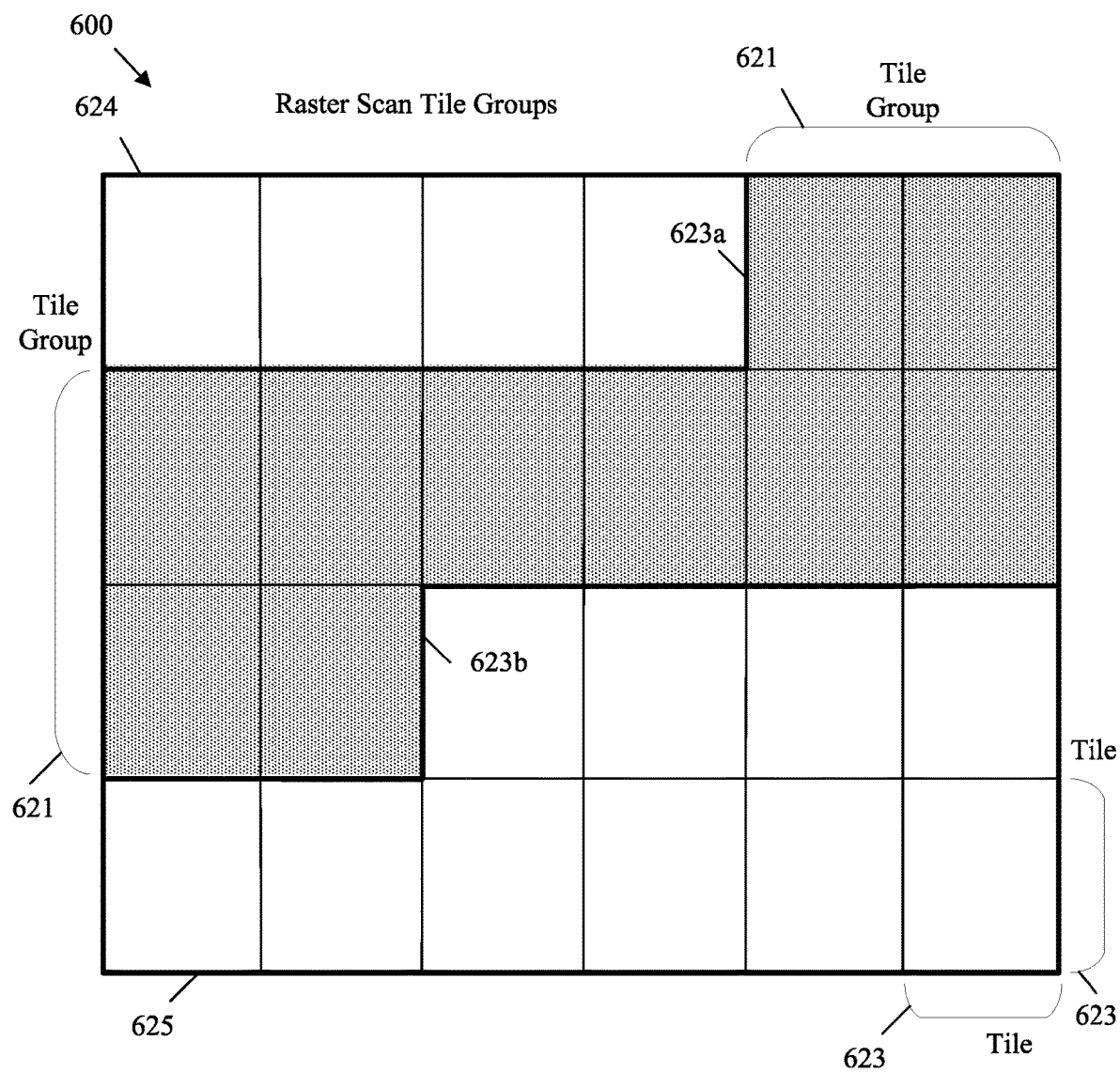
FIG. 6 is a schematic diagram illustrating an example picture partitioned into raster scan tile groups.
Figure 6:
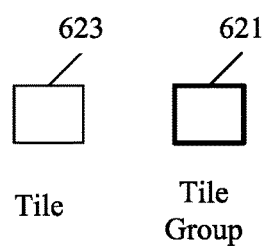
Figure 7:
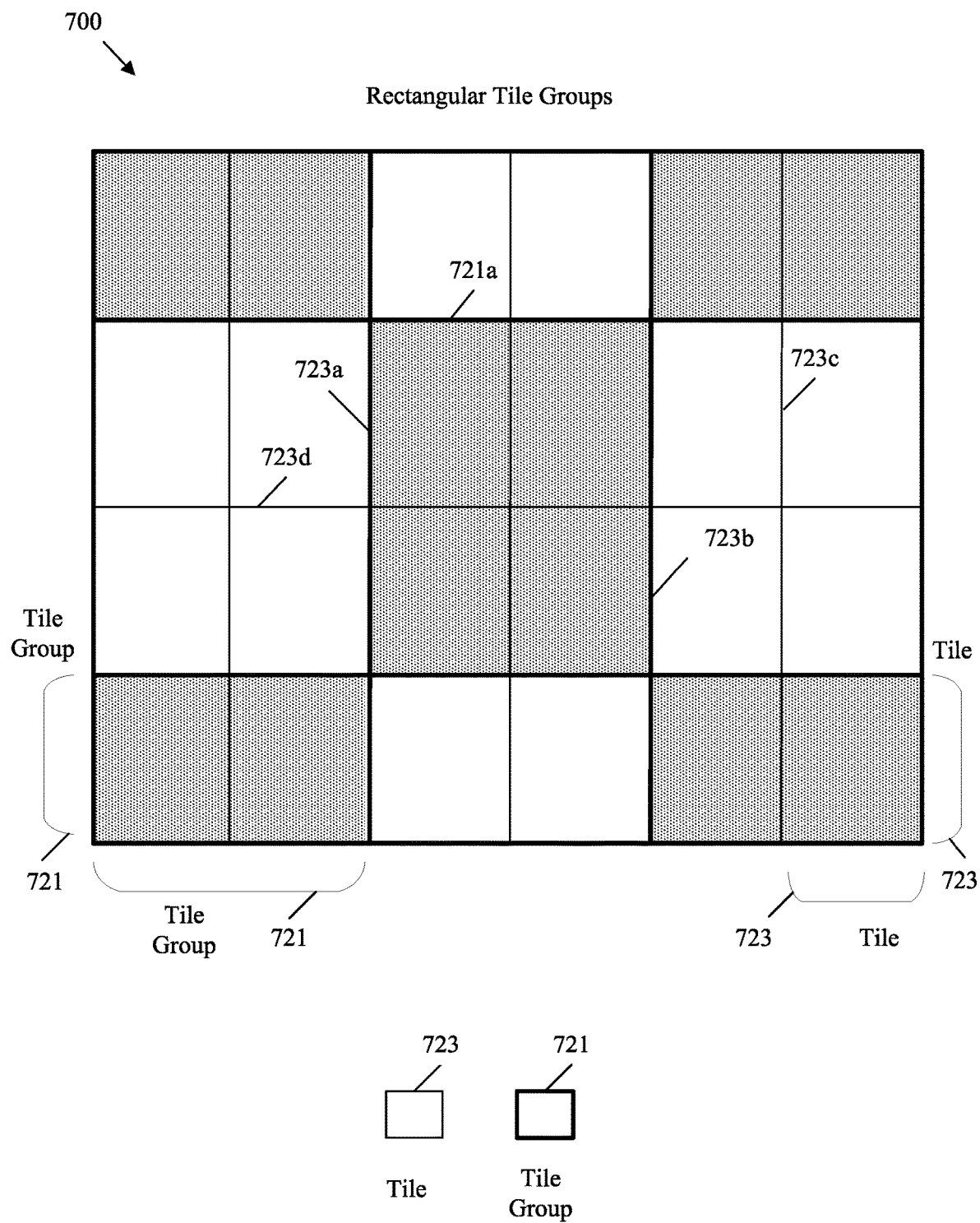
FIG. 7 is a schematic diagram illustrating an example picture partitioned into rectangular tile groups.

A tile group 521 is a set of related tiles 523 that can be separately extracted and coded, for example to support display of a region of interest and/or to support parallel processing. A picture may contain one or more tile groups 521. Each tile group 521 references coding tools in a corresponding tile group header 514. Accordingly, a current tile group 521 can be coded using different coding tools from other tile groups 521 by altering data in a corresponding tile group header 514. A tile group 521 may be described in terms of the mechanism used to assign the tiles 523 to the tile group 521. A tile group 521 that contains tiles 523 assigned in raster scan order may be referred to as a raster scan tile group. A tile group 521 that contains tiles 523 assigned to create a rectangle (or square) may be referred to as a rectangular tile group. FIGS. 6-7 include examples of raster scan tile groups and rectangular tile groups, respectively, as discussed in more detail below.

A tile 523 is a partitioned portion of a picture created by horizontal and vertical boundaries. Tiles 523 may be rectangular and/or square. A picture may be petitioned into rows and columns of tiles 523. A tile 523 row is a set of tiles 523 positioned in a horizontally adjacent manner to create a continuous line from the left boundary to the right boundary of a picture (or vice versa). A tile 523 column is a set of tiles 523 positioned in a vertically adjacent manner to create a continuous line from the top boundary to the bottom boundary of the picture (or vice versa). Tiles 523 may or may not allow prediction based on other tiles 523, depending on the example. For example, a tile group 521 may contain a set of tiles 523 designated as a MCTS. Tiles 523 in a MCTS can be coded by prediction from other tiles 523 in the MCTS, but not by tiles 523 outside the MCTS. Tiles 523 can be further partitioned into CTUs. Coding trees can be employed to partition CTUs into coding blocks, which can be coded according to intra-prediction or inter-prediction.

Each tile 523 may have a unique tile index 524 in the picture. A tile index 524 is a procedurally selected numerical identifier that can be used to distinguish one tile 523 from another. For example, tile indices 524 may increase numerically in raster scan order. Raster scan order is left to right and top to bottom. It should be noted that, in some examples, tiles 523 may also be assigned tile identifiers (IDs). A tile ID is an assigned identifier that can be used to distinguish one tile 523 from another. Computations may employ tile IDs instead of tile indices 524 in some examples. Further, tile IDs can be assigned to have the same values as the tile indices 524 in some examples. In some examples, tile indices 524 and/or IDs may be signaled to indicate boundaries of tile groups 521 containing the tiles 523. Further, the tile indices 524 and/or IDs may be employed to map image data 520 associated with a tile 523 to a proper position for display.

As noted above, a tile group 521 may be a raster scan tile group or a rectangular tile group. The present disclosure includes signaling mechanisms to allow a codec to support both tile group 521 types in a manner that supports increased coding efficiency and reduces complexity. A tile group flag 531 is a data unit that can be employed to signal whether corresponding tile groups 521 are raster scan or rectangular. The tile group flag 531 can be signaled in the SPS 510 or the PPS 512, depending on the example. The tiles 523 assigned to a tile group 521 can be signaled by indicating a first tile 532 and a last tile 533 in the bitstream 500. For example, the first tile 532 may contain a tile index 524 or ID of a tile 523 in a first position in the tile group 521. A first position is a top left corner for a rectangular tile group and a smallest index/ID in raster scan tile group. Further, the last tile 533 may contain a tile index 524 or ID of a tile 523 in a last position in the tile group 521. A last position is a bottom right corner for a rectangular tile group and a largest index/ID in raster scan tile group.

The tile group flag 531, the first tile 532, and the last tile 533 provide sufficient information to allow a decoder to determine the tiles 523 in a tile group 521. For example, a raster scan mechanism can determine the tiles 523 in a raster scan tile group based on the first tile 532 and the last tile 533. Further, a rectangular mechanism can determine the tiles 523 in a rectangular tile group based on the first tile 532 and the last tile 533. This allows the tile indices 524 for other tiles 523 in the corresponding tile group 521 to be omitted from the bitstream 500, which reduces bitstream 500 size and hence increases coding efficiency. As such, the tile group flag 531 provides sufficient information to allow the decoder to determine which mechanism to employ to determine which tiles 523 are assigned to the tile group 521.

Accordingly, an encoder can determine whether to use raster scan or rectangular tile groups for the bitstream 500 or sub-portions thereof. The encoder can then then set the tile group flag 531. Further, the encoder can assign tiles 523 to a tile group 521 and include the first tile 532 and the last tile 533 in the bitstream 500. A hypothetical reference decoder (HRD) at the encoder can then determine tile 523 assignment to the tile group 521 based on the tile group flag 531, the first tile 532, and the last tile 533. The HRD is a set of encoder side modules that predict decoding results at a decoder as part of selecting an optimal coding approach during RDO. Further, the decoder can receive the bitstream 500 and determine tile group 521 assignment based on the tile group flag 531, the first tile 532, and the last tile 533. Specifically, both the HRD at the encoder and the decoder may select a raster scan mechanism or a rectangular mechanism based on the tile group flag 531. The HRD and the decoder can then employ the selected mechanism to determine the assignment of the tiles 523 to the tile group 521 based on the first tile 532 and the last tile 533.

The following is a specific example of the abovementioned mechanisms.

```
firstTileIdx = TileIdToIdx[ first_tile_id ]
lastTileIdx = TileIdToIdx[ last_tile_id ]
if( rectangular_tile_group_flag ) {
   deltaTileIdx = lastTileIdx - firstTileIdx
   numTileRows = ( deltaTileIdx / ( num_tile_columns_minus1 + 1 ) ) + 1
   numTileColumns = ( deltaTileIdx % ( num_tile_columns_minus1 + 1 ) ) + 1
   NumTilesInTileGroup = numTileRows * numTileColumns
   tileIdx = firstTileIdx
   for( j = 0, tIdx = 0; j < numTileRows; j++, tileIdx += num_tile_columns_minus1 + 1 )
{
     for( i = 0, currTileIdx = tileIdx; i < numTileColumn; i++, currTileIdx++, tIdx++ )
```

```
{
    TgTileIdx[ tIdx ] = currTileIdx
} else {
  NumTilesInTileGroup = lastTileIdx − firstTileIdx + 1
  TgTileIdx[ 0 ] = firstTileIdx
  for( i = 1, i < NumTilesInTileGroup, i++)
    TgTileIdx[ i ] = TgTileIdx[ i − 1 ] + 1
}
```

In this example, the tile group flag 531, denoted as rectangular_tile_group_flag, can be employed to select a rectangular mechanism (e.g., the if statement) or a raster scan mechanism (e.g., the else statement). The rectangular mechanism determines a delta value between the first tile of the tile group and the last tile of the tile group. The number of tile group rows is determined by dividing the delta value by a number of tile columns in the picture plus one. The number of tile group columns is determined by the delta value modulo the number of tile columns in the picture plus one. The tile assignment can then be determined based on the number of tile group rows and the number of tile group columns (e.g., the for loops in the if statement). Meanwhile, the raster scan mechanism determines a number of tiles between a first tile of the tile group and a last tile of the tile group. As the tiles are indexed in raster scan order, the raster scan mechanism can then add the determined number of tiles to the tile group in raster scan order (e.g., the for loop in the else statement).

FIG. 6 is a schematic diagram illustrating an example picture 600 partitioned into raster scan tile groups 621. For example, the picture 600 can be encoded in and decoded from a bitstream 500, for example by a codec system 200, an encoder 300, and/or a decoder 400. Further, the picture 600 can be partitioned to support encoding and decoding according to method 100.

The picture 600 includes tiles 623 assigned to raster scan tile groups 621, 624, and 625, which may be substantially similar to tiles 523 and tile group 521, respectively. The tiles 623 are assigned to the raster scan tile groups 621, 624, and 625 in raster scan order on a tile 623 by tile 623 basis. To clearly depict the boundaries between the raster scan tile groups 621, 624, and 625, each tile group is surrounded by an outline in bold typeface. Further, tile group 621 is depicted by shading to further distinguish between tile group boundaries. It should also be noted that a picture 600 may be partitioned into any number of raster scan tile groups 621, 624, and 625. For clarity of discussion, the following description relates to raster scan tile group 621. However, tiles 623 are assigned to raster scan tile groups 624 and 625 in a manner similar to raster scan tile group 621.

As shown, a first tile 623a, a last tile 623b, and all shaded tiles between the first tile 623a and the last tile 623b are assigned to the tile group 621 in raster scan order. As shown, a mechanism (e.g., a method operating on a processor) proceeding according to raster scan order assigns the first tile 623a to the tile group 621 and then proceeds to assign each tile 623 to the tile group 621 (from left to right) until the right picture 600 boundary is reached (unless a last tile 623b is reached). Raster scan order then proceeds to the next row of tiles 623 (e.g., from top row(s) toward the bottom row(s)). In the present case, the first tile 623a is on the first row, and hence the next row is the second row. Specifically, the raster scan order proceeds to the first tile on the second row at the left picture 600 boundary, and then proceeds from left to right across the second row until the right picture 600 boundary is reached. The raster scan then moves the next row, which is the third row in this case, and proceeds with assignment from the first tile on the third row at the left picture 600 boundary. The raster scan then moves right across the third row. This order continues until the last tile 623b is reached. At this point, the tile group 621 is complete. Additional tiles 623 below and/or to the right of tile group 621 can be assigned to tile group 625 in raster scan order in a similar manner. Tiles 623 above and/or to the left of tile group 621 are assigned to tile group 624 in a similar manner.

FIG. 7 is a schematic diagram illustrating an example picture 700 partitioned into rectangular tile groups 721. For example, the picture 700 can be encoded in and decoded from a bitstream 500, for example by a codec system 200, an encoder 300, and/or a decoder 400. Further, the picture 700 can be partitioned to support encoding and decoding according to method 100.

The picture 700 includes tiles 723 assigned to a rectangular tile group 721, which may be substantially similar to tiles 523 and tile group 521, respectively. The tiles 723 assigned to the rectangular tile group 721 are depicted in FIG. 7 as surrounded by an outline in bold typeface. Further, selected rectangular tile groups 721 are shaded to clearly delineate between rectangular tile groups 721. As shown, a rectangular tile group 721 includes a set of tiles 723 that make a rectangular shape. It should be noted that rectangular tile groups 721 may also be square as a square is a particular case of a rectangle. As shown, a rectangle has four sides where each side is connected to two other sides by a right angle (e.g., a ninety degree angle). A rectangular tile group 721a contains a first tile 723a and a last tile 723b. The first tile 723a is at the top left corner of the rectangular tile group 721a and the last tile is at the bottom right corner of the rectangular tile group 721a. Tiles 723 included in or between the rows and columns containing the first tile 723a and the last tile 723b are also assigned to the rectangular tile group 721a on a tile by tile basis. As shown, this scheme is different from raster scan. For example, tile 723c is between the first tile 723a and a last tile 723b in raster scan order, but is not included in the same rectangular tile group 721a. Rectangular tile groups 721 may be more computationally complex than raster scan tile groups 621 due to the geometries involved. However, rectangular tile groups 721 are more flexible. For example, a rectangular tile group 721a may contain tiles 723 from different rows without containing every tile between the first tile 723 and the right boundary of the picture 700 (e.g., such as tile 723c). The rectangular tile group 721a may also exclude selected tiles between the left picture boundary and the last tile 723b. For example, tile 723d is excluded from the tile group 721a.

Accordingly, rectangular tile groups 721 and raster scan tile groups 621 each have different benefits, and hence may each be more optimal for different use cases. For example, raster scan tile groups 621 may be more beneficial when the entire picture 600 is to be displayed and rectangular tile groups 721 may be more beneficial when only a sub-picture is to be displayed. However, as noted above different mechanisms may be employed to determine which tiles are assigned to the tile group when only the first tile index and last tile index are signaled in the bitstream. As such, a flag indicating which tile group type is employed can be used by the decoder or HRD to select the appropriate raster scan or rectangular mechanism. The tile assignment to the tile group can then be determined by employing the first tile and last tile in the tile group.

By employing the forgoing, video coding systems can be improved. As such, this disclosure describes various improvements to grouping of tiles in video coding. More specifically, this disclosure describes signaling and derivation processes to support two different tile group concepts, raster-scan based tile groups, and rectangular tile groups. In one example, a flag is employed in a parameter set that is referred to directly or indirectly by the corresponding tile group. The flag specifies which tile group approach is used. The flag can be signaled in a parameter set such as the sequence parameter set, the picture parameter set, or another type of parameter set that is referred to directly or indirectly by tile groups. As a specific example, the flag may be a rectangular_tile_group_flag. In some examples, an indication with two or more bits may be defined and signaled in a parameter set that is referred to directly or indirectly by corresponding tile groups. The indication may specify which tile group approach is used. Using such an indication, two or more tile group approaches can be supported. The number of bits for signaling the indication depends on the number of tile group approaches to be supported. In some examples, the flag or the indication can be signaled in the tile group header.

Signaling information indicating the first tile and the last tile that are included in the tile group may be sufficient to indicate which tiles are included in a raster-scan tile group or rectangular tile group. Derivation of tiles that are included in a tile group may depend on the tile group approach used (which may be indicated by the flag or indication), information of the first tile in the tile group, and information of the last tile in the tile group. The information for identifying a particular tile can be any of the following: the tile index, the tile ID (if different from the tile index), a CTU included in the tile (e.g., the first CTU included in the tile), or a luma sample included in the tile (e.g., the first luma sample included in the tile).

The following is a specific embodiment of the abovementioned mechanisms. A picture parameter set RBSP syntax may be as follows.

|  | Descriptor |
|---|---|
| pic_parameter_set_rbsp( ) { | |
| ... | |
| tile_id_len_minus1 | ue(v) |
| ... | |
| rectangular_tile_group_flag | u(1) |
| ... | |
| } | |

The tile_id_len_minus1 plus 1 specifies the number of bits used to represent the syntax element tile_id_val[i][j], when present, in the PPS, and the syntax element first_tile_id and last_tile_id in tile group headers referring to the PPS. The value of tile_id_len_minus1 may be in the range of Ceil(Log 2(NumTilesInPic) to 15, inclusive. The rectangular_tile_group_flag, when set equal to one, may specify that tile groups referring to the PPS include of one or more tiles that form a rectangular area of a picture. The rectangular_tile_group_flag, when set equal to zero, may specify that tile groups referring to the PPS include of one or more tiles that are consecutive in raster scan order of the picture.

The tile group header syntax may be as follows.

|  | Descriptor |
|---|---|
| tile_group_header( ) { | |
| ... | |
| single_tile_in_tile_group_flag // Same as single_tile_in_slice_flag in IDF #86002675 | u(1) |
| first_tile_id // Same as top_left_tile_id in IDF #86002675 | u(v) |
| if( !single_tile_in_tile_group_flag ) { | |
| last_tile_id // Same as bottom_right_tile_id in IDF #86002675 | u(v) |
| ... | |
| } | |

The single_tile_in_tile_group_flag, when set equal to one, may specify that there is only one tile in the tile group. The single_tile_in_tile_group_flag, when set equal to zero, may specify that there is more than one tile in the tile group. The first_tile_id may specify the tile ID of the first tile of the tile group. The length of first_tile_id may be tile_id_len_minus1+1 bits. The value of first_tile_id may not be equal to the value of first_tile_id of any other coded tile group of the same coded picture. When there is more than one tile group in a picture, the decoding order of the tile groups in the picture may be in increasing value of first_tile_id. The last_tile_id may specify the tile ID of the last tile of the tile group. The length of last_tile_id may be tile_id_len_minus1+1 bits. When not present, the value of last_tile_id may be inferred to be equal to first_tile_id.

The variable NumTilesInTileGroup, which specifies the number of tiles in the tile group, and TgTileIdx[i], which specifies the tile index of the i-th tile in the tile group, may be derived as follows:

```
firstTileIdx = TileIdToIdx[ first_tile_id ]
lastTileIdx = TileIdToIdx[ last_tile_id ]
if( rectangular_tile_group_flag ) {
   deltaTileIdx = lastTileIdx - firstTileIdx
   numTileRows = ( deltaTileIdx / ( num_tile_columns_minus1 + 1 ) ) + 1
   numTileColumns = ( deltaTileIdx % ( num_tile_columns_minus1 + 1 ) ) + 1
   NumTilesInTileGroup = numTileRows * numTileColumns
   tileIdx = firstTileIdx
   for( j = 0, tIdx = 0; j < numTileRows; j++, tileIdx += num_tile_columns_ minus1 + 1 )
   {
       for( i = 0, currTileIdx = tileIdx; i < numTileColumn; i++, currTileIdx++, tIdx++ )
   {
          TgTileIdx[ tIdx ] = currTileIdx
   }
} else {
   NumTilesInTileGroup = lastTileIdx - firstTileIdx + 1
   TgTileIdx[ 0 ] = firstTileIdx
   for( i = 1, i < NumTilesInTileGroup, i++)
      TgTileIdx[ i ] = TgTileIdx[ i - 1 ] + 1
}
```

The general tile group data syntax may be as follows.

|  | Descriptor |
|---|---|
| tile_group_data( ) { <br>   for( i = 0; i < NumTilesInTileGroup; i++ ) { <br>     ctbAddrInTs = FirstCtbAddrTs[ TgTileIdx[ i ] ] <br>     for( j = 0; j < NumCtusInTile[ TgTileIdx[ i ] ]; j++, ctbAddrInTs++ ) { <br>       CtbAddrInRs = CtbAddrTsToRs[ ctbAddrInTs ] <br>       coding_tree_unit( ) <br>     } <br>     end_of_tile_one_bit /* equal to 1 */ <br>     if( i < NumTilesInTileGroup - 1 ) <br>       byte_alignment( ) <br>   } <br> } |  <br>  <br>  <br>  <br>  <br>  <br>  <br>  <br> ae(v) <br>  <br>  |

Figure 8:
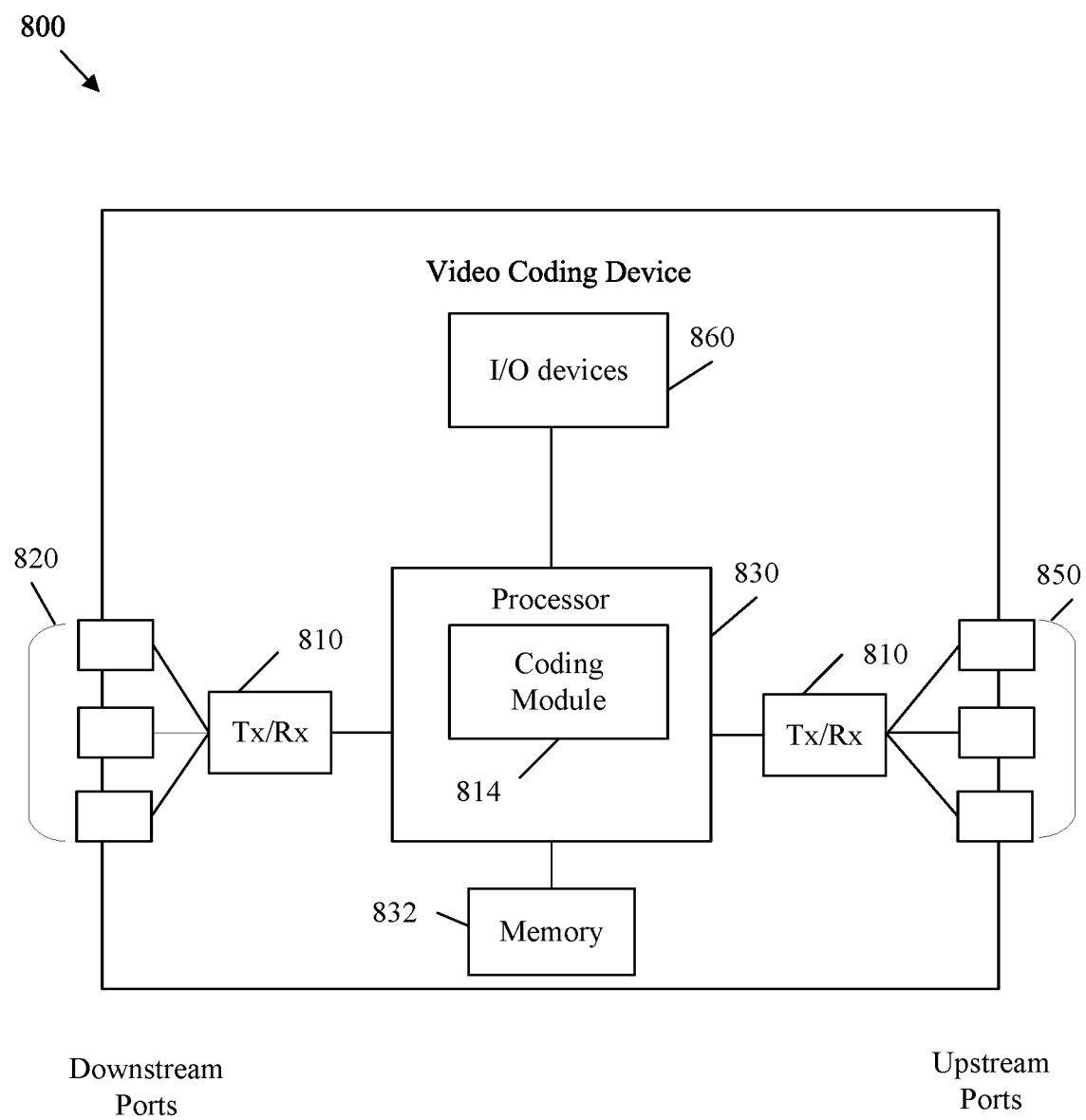
FIG. 8 is a schematic diagram of an example video coding device.

FIG. 8 is a schematic diagram of an example video coding device 800. The video coding device 800 is suitable for implementing the disclosed examples/embodiments as described herein. The video coding device 800 comprises downstream ports 820, upstream ports 850, and/or transceiver units (Tx/Rx) 810, including transmitters and/or receivers for communicating data upstream and/or downstream over a network. The video coding device 800 also includes a processor 830 including a logic unit and/or central processing unit (CPU) to process the data and a memory 832 for storing the data. The video coding device 800 may also comprise electrical, optical-to-electrical (OE) components, electrical-to-optical (EO) components, and/or wireless communication components coupled to the upstream ports 850 and/or downstream ports 820 for communication of data via electrical, optical, or wireless communication networks. The video coding device 800 may also include input and/or output (I/O) devices 860 for communicating data to and from a user. The I/O devices 860 may include output devices such as a display for displaying video data, speakers for outputting audio data, etc. The I/O devices 860 may also include input devices, such as a keyboard, mouse, trackball, etc., and/or corresponding interfaces for interacting with such output devices.

The processor 830 is implemented by hardware and software. The processor 830 may be implemented as one or more CPU chips, cores (e.g., as a multi-core processor), field-programmable gate arrays (FPGAs), application specific integrated circuits (ASICs), and digital signal processors (DSPs). The processor 830 is in communication with the downstream ports 820, Tx/Rx 810, upstream ports 850, and memory 832. The processor 830 comprises a coding module 814. The coding module 814 implements the disclosed embodiments described herein, such as methods 100, 900, and 1000, which may employ a bitstream 500, a picture 600, and/or a picture 700. The coding module 814 may also implement any other method/mechanism described herein. Further, the coding module 814 may implement a codec system 200, an encoder 300, and/or a decoder 400. For example, the coding module 814 can partition an image into tile groups and/or tiles, tiles into CTUs, CTUs into blocks, and encode the blocks when acting as an encoder. Further, the coding module 814 can select raster scan or rectangular tile groups and signal such selection in a bitstream. The coding module 814 may also signal the first tile and last tile to support determination of tile assignment to tile groups. When acting as a decoder or HRD, the coding module 814 can determine the type of tile group used and determine the tiles assigned to the tile group based on the first tile and last tile. Hence, coding module 814 causes the video coding device 800 to provide additional functionality and/or coding efficiency when partitioning and coding video data. As such, the coding module 814 improves the functionality of the video coding device 800 as well as addresses problems that are specific to the video coding arts. Further, the coding module 814 effects a transformation of the video coding device 800 to a different state. Alternatively, the coding module 814 can be implemented as instructions stored in the memory 832 and executed by the processor 830 (e.g., as a computer program product stored on a non-transitory medium).

The memory 832 comprises one or more memory types such as disks, tape drives, solid-state drives, read only memory (ROM), random access memory (RAM), flash memory, ternary content-addressable memory (TCAM), static random-access memory (SRAM), etc. The memory 832 may be used as an over-flow data storage device, to store programs when such programs are selected for execution, and to store instructions and data that are read during program execution.

Figure 9:
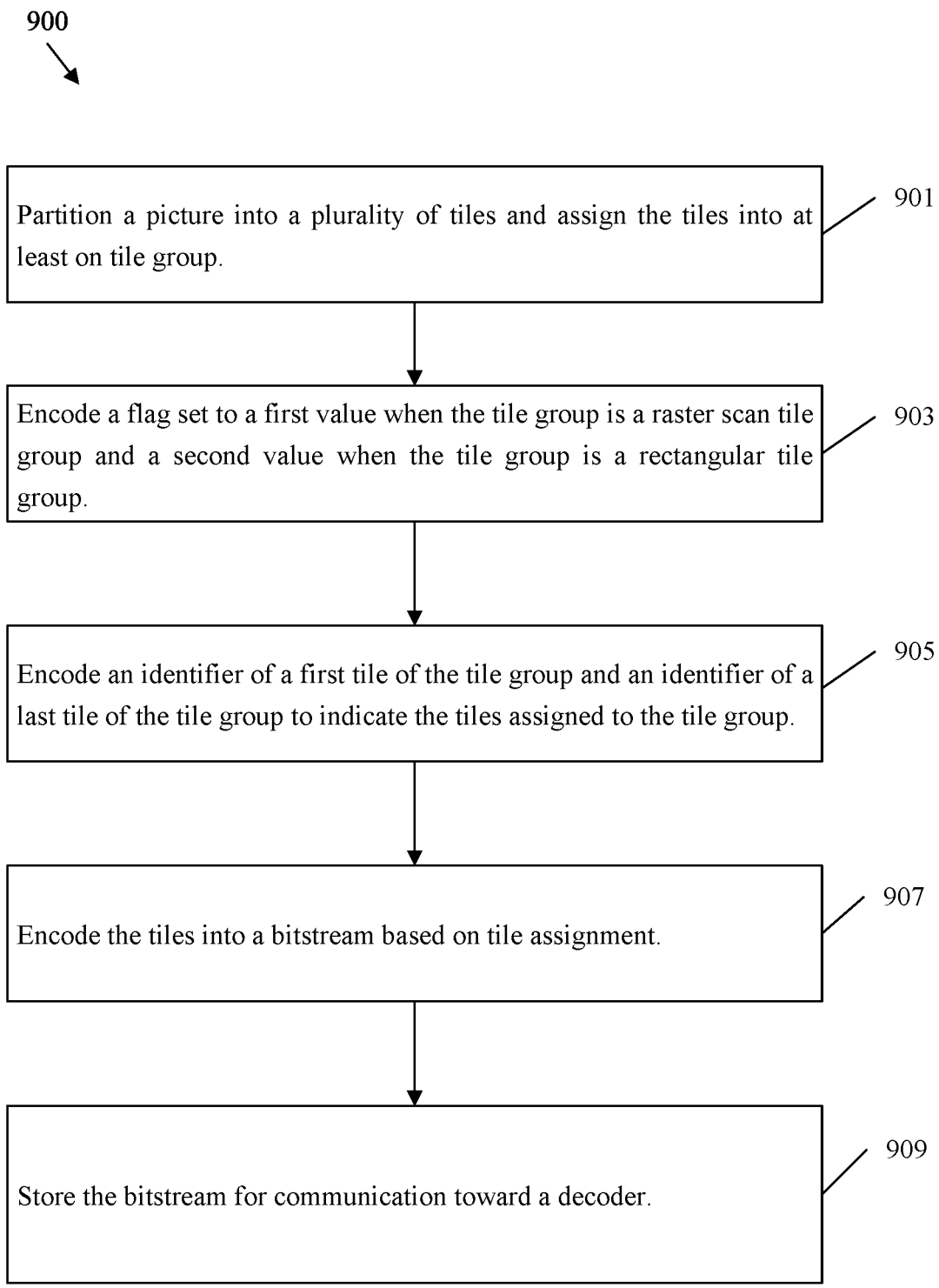
FIG. 9 is a flowchart of an example method of encoding a picture into a bitstream.

FIG. 9 is a flowchart of an example method 900 of encoding a picture, such as picture 600 and/or 700, into a bitstream, such as bitstream 500. Method 900 may be employed by an encoder, such as a codec system 200, an encoder 300, and/or a video coding device 800 when performing method 100.

Method 900 may begin when an encoder receives a video sequence including a plurality of pictures and determines to encode that video sequence into a bitstream, for example based on user input. The video sequence is partitioned into pictures/images/frames for further partitioning prior to encoding. At step 901, a picture is partitioned into a plurality of tiles. Further, the tiles are assigned into a plurality of tile groups, and hence a subset of the tiles are assigned a tile group. In some examples, the tile group is a raster scan tile group. In other examples, the tile group is a rectangular tile group.

At step 903, a flag is encoded into the bitstream. The flag can be set to a first value when the tile group is a raster scan tile group and a second value when the tile group is a rectangular tile group. The flag may be encoded into a parameter set of the bitstream. For example, the parameter set into which the flag is encoded may be a sequence parameter set or a picture parameter set. In some examples, the flag is a rectangular tile group flag.

At step 905, an identifier of a first tile of the tile group and an identifier of a last tile of the tile group is encoded in the bitstream. The first tile of the tile group and the last tile of the tile group may be used to indicate the tiles assigned to the tile group. In some examples, the identifier of the first tile of the tile group and the identifier of the last tile of the tile group are encoded in a tile group header in the bitstream.

The flag, the first tile of the tile group, and the last tile of the tile group can be used by the decoder and/or by an HRD at the encoder to determine tile assignment for the tile group. When the tile group is the raster scan tile group, as indicated by the flag, the tile assignment for the tile group can be determined as follows. A number of tiles between the first tile of the tile group and the last tile of the tile group can be determined as a number of tiles in the tile group. The tile assignment can then be determined based on the number of tiles in the tile group. When the tile group is the rectangular tile group, as indicated by the flag, the tile assignment for the tile group can be determined as follows. A delta value between the first tile of the tile group and the last tile of the tile group can be determined. A number of tile group rows can be determined based on the delta value and a number of tile columns in the picture. A number of tile group columns can also be determined based on the delta value and the number of tile columns in the picture. The tile assignment can then be determined based on the number of tile group rows and the number of tile group columns.

At step 907, the tiles are encoded into a bitstream based on tile assignment. The bitstream may also be stored for communication toward a decoder at step 909.

Figure 10:
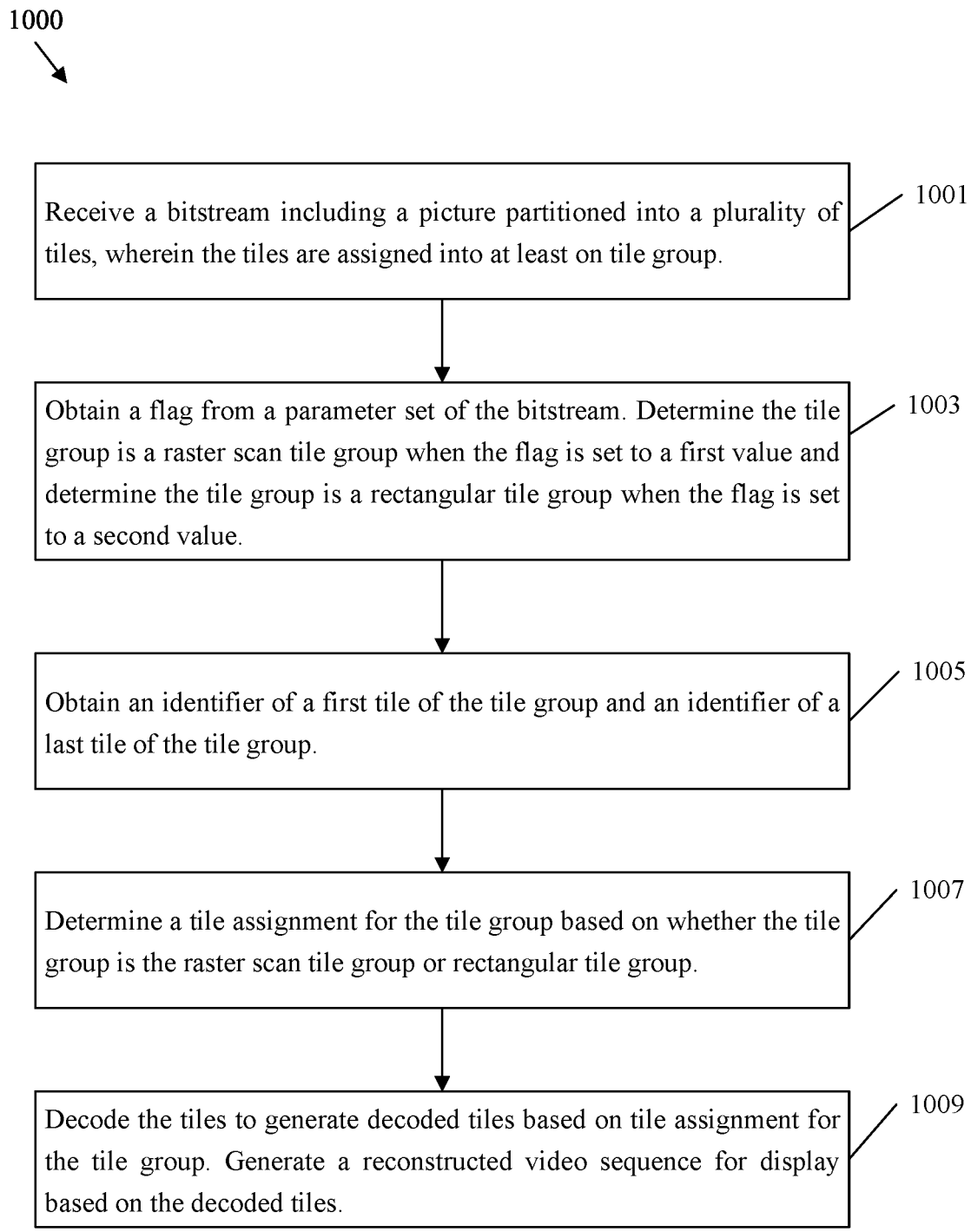
FIG. 10 is a flowchart of an example method of decoding a picture from a bitstream.

FIG. 10 is a flowchart of an example method 1000 of decoding a picture, such as picture 600 and/or 700, from a bitstream, such as bitstream 500. Method 1000 may be employed by a decoder, such as a codec system 200, a decoder 400, and/or a video coding device 800 when performing method 100. For example, method 1000 may be employed in response to method 900.

Method 1000 may begin when a decoder begins receiving a bitstream of coded data representing a video sequence, for example as a result of method 900. At step 1001, a bitstream is received at a decoder. The bitstream includes a picture partitioned into a plurality of tiles. The tiles are assigned into a plurality of tile groups, and hence a subset of the tiles are assigned to a tile group. In some examples, the tile group is a raster scan tile group. In other examples, the tile group is a rectangular tile group.

At step 1003, a flag is obtained from a parameter set of the bitstream. The tile group is determined to be a raster scan tile group when the flag is set to a first value. The tile group is determined to be a rectangular tile group when the flag is set to a second value. For example, the parameter including the flag may be a sequence parameter set or a picture parameter set. In some examples, the flag is a rectangular tile group flag.

At step 1005, an identifier of a first tile of the tile group and an identifier of a last tile of the tile group are obtained to support determination of the tiles assigned to the tile group. In some examples, the identifier of the first tile of the tile group and the identifier of the last tile of the tile group are obtained from a tile group header in the bitstream.

At step 1007, the tile assignment for the tile group is determined based on whether the tile group is the raster scan tile group or rectangular tile group. For example, the flag, the first tile of the tile group, and the last tile of the tile group can be used to determine tile assignment for the tile group. When the tile group is the raster scan tile group, as indicated by the flag, the tile assignment for the tile group can be determined as follows. A number of tiles between the first tile of the tile group and the last tile of the tile group can be determined as a number of tiles in the tile group. The tile assignment can then be determined based on the number of tiles in the tile group. When the tile group is the rectangular tile group, as indicated by the flag, the tile assignment for the tile group can be determined as follows. A delta value between the first tile of the tile group and the last tile of the tile group can be determined. A number of tile group rows can be determined based on the delta value and a number of tile columns in the picture. A number of tile group columns can also be determined based on the delta value and the number of tile columns in the picture. The tile assignment can then be determined based on the number of tile group rows and the number of tile group columns.

At step 1009, the tiles are decoded to generate decoded tiles based on tile assignment for the tile group. A reconstructed video sequence can also be generated for display based on the decoded tiles.

Figure 11:
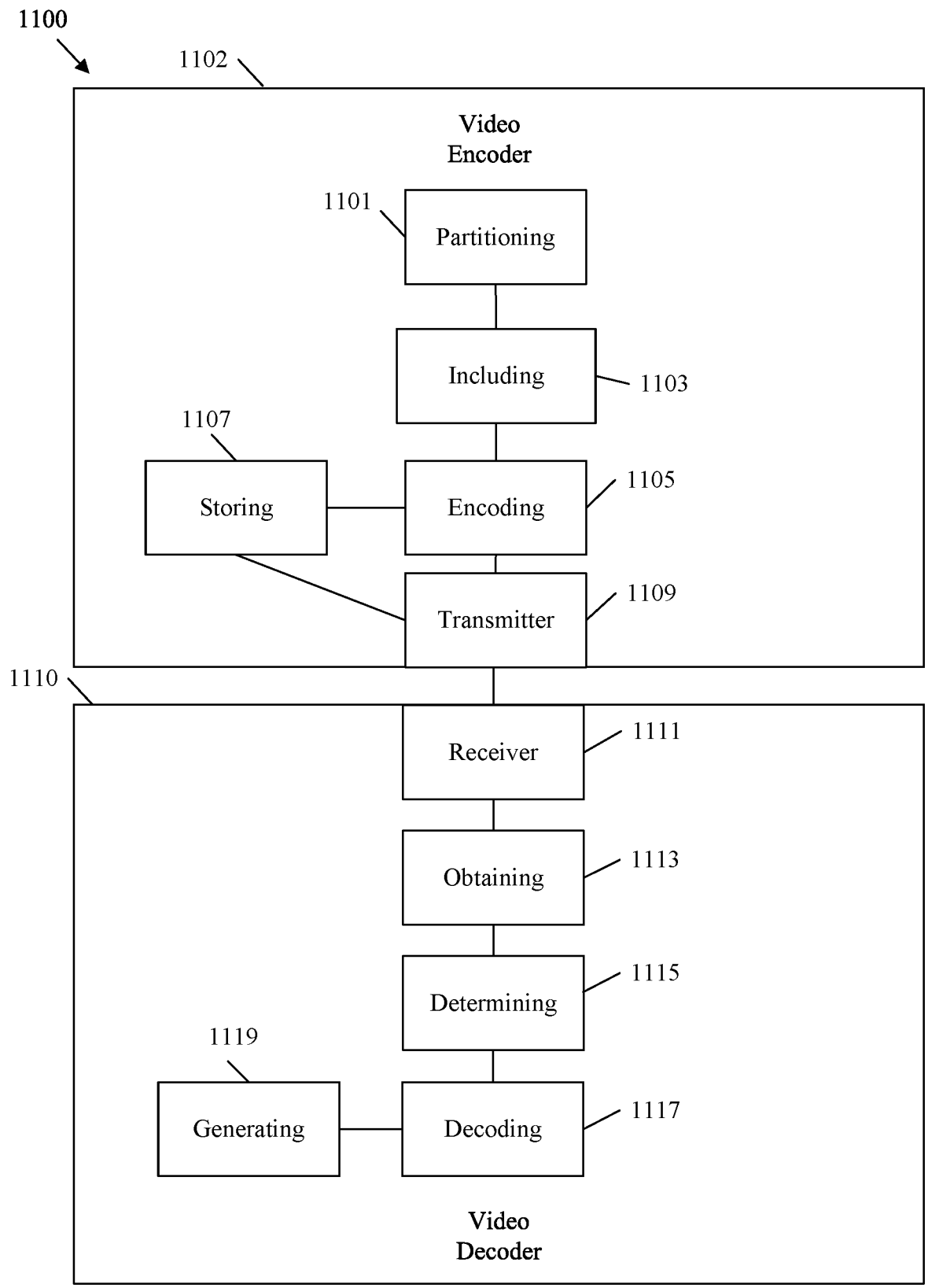
FIG. 11 is a schematic diagram of an example system for coding a video sequence of pictures in a bitstream.

FIG. 11 is a schematic diagram of an example system 1100 for coding a video sequence of pictures, such as picture 600 and/or 700, in a bitstream, such as bitstream 500. System 1100 may be implemented by an encoder and a decoder such as a codec system 200, an encoder 300, a decoder 400, and/or a video coding device 800. Further, system 1100 may be employed when implementing method 100, 900, and/or 1000.

The system 1100 includes a video encoder 1102. The video encoder 1102 comprises a partitioning module 1101 for partitioning a picture into a plurality of tiles. The video encoder 1102 further comprises an including module 1103 for including a number of the tiles into a tile group. The video encoder 1102 further comprises an encoding module 1105 for encoding a flag set to a first value when the tile group is a raster scan tile group and a second value when the tile group is a rectangular tile group, wherein the flag is encoded into a parameter set of the bitstream, and encoding the tiles into a bitstream based on the tile group. The video encoder 1102 further comprises a storing module 1107 for storing the bitstream for communication toward a decoder. The video encoder 1102 further comprises a transmitting module 1109 for transmitting the bitstream to support determining the type of tile group(s) used and the tiles included in the tile group(s). The video encoder 1102 may be further configured to perform any of the steps of method 900.

The system 1100 also includes a video decoder 1110. The video decoder 1110 comprises a receiving module 1111 for receiving a bitstream including a picture partitioned into a plurality of tiles, wherein a number of the tiles are included in a tile group. The video decoder 1110 further comprises an obtaining module 1113 for obtaining a flag from a parameter set of the bitstream. The video decoder 1110 further comprises a determining module 1115 for determining the tile group is a raster scan tile group when the flag is set to a first value, determining the tile group is a rectangular tile group when the flag is set to a second value, and determining tile inclusion for the tile group based on whether the tile group is the raster scan tile group or rectangular tile group. The video decoder 1110 further comprises a decoding module 1117 for decoding the tiles to generate decoded tiles based on the tile group. The video decoder 1110 further comprises a generating module 1119 for generating a reconstructed video sequence for display based on the decoded tiles. The video decoder 1110 may be further configured to perform any of the steps of method 1000.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

It should also be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other examples of changes, substitutions, and alterations are ascertainable by one skilled in the art and may be made without departing from the spirit and scope disclosed herein.

What is claimed is:

1. A method implemented by an encoder, the method comprising:
    partitioning a picture into a plurality of tiles;
    including a number of the tiles into a tile group;
    encoding a flag set to a first value when the tile group is a raster scan tile group and a second value when the tile group is a rectangular tile group, wherein the flag is encoded into a parameter set of a bitstream;
    encoding in the bitstream an identifier of a first tile of the tile group to indicate the tiles included in the tile group;
    encoding in the bitstream an identifier of a last tile of the tile group to indicate the tiles included in the tile group;
    encoding the tiles into the bitstream based on the tile group; and
    storing the bitstream for communication toward a decoder.

2. The method of claim 1, wherein the flag is a rectangular tile group flag.

3. The method of claim 1, wherein the parameter set into which the flag is encoded is a sequence parameter set.

4. The method of claim 1, wherein the parameter set into which the flag is encoded is a picture parameter set.

5. The method of claim 1, wherein the identifier of the first tile of the tile group and the identifier of the last tile of the tile group are encoded in a tile group header in the bitstream.

6. The method of claim 1, wherein when the tile group is the raster scan tile group, tile inclusion in the tile group is determined by:
    determining a number of tiles between the first tile of the tile group and the last tile of the tile group as the number of tiles in the tile group; and
    determining the tile inclusion based on the number of tiles in the tile group.

7. The method of claim 1, wherein when the tile group is the rectangular tile group, tile inclusion in the tile group is determined by:
    determining a delta value between the first tile of the tile group and the last tile of the tile group;
    determining a number of tile group rows based on the delta value and a number of tile columns in the picture;
    determining a number of tile group columns based on the delta value and the number of tile columns in the picture; and
    determining the tile inclusion based on the number of tile group rows and the number of tile group columns.

8. A method implemented by a decoder, the method comprising:
    receiving a bitstream including a picture partitioned into a plurality of tiles, wherein a number of the tiles are included into a tile group;
    obtaining a flag from a parameter set of the bitstream;
    determining the tile group is a raster scan tile group when the flag is set to a first value;
    determining the tile group is a rectangular tile group when the flag is set to a second value;
    determining tile inclusion for the tile group based on whether the tile group is the raster scan tile group or rectangular tile group;
    obtaining an identifier of a first tile of the tile group to determine the tiles included in the tile group;
    obtaining an identifier of a last tile of the tile group to determine the tiles included in the tile group;
    decoding the tiles to generate decoded tiles based on the tile group; and
    generating a reconstructed video sequence for display based on the decoded tiles.

9. The method of claim 8, wherein the flag is a rectangular tile group flag.

10. The method of claim 8, wherein the parameter set including the flag is a sequence parameter set.

11. The method of claim 8, wherein the parameter set including the flag is a picture parameter set.

12. The method of claim 8, wherein the identifier of the first tile of the tile group and the identifier of the last tile of the tile group are obtained from a tile group header in the bitstream.

13. The method of claim 8, wherein when the tile group is the raster scan tile group, the tile inclusion in the tile group is determined by:
 determining a number of tiles between the first tile of the tile group and the last tile of the tile group as the number of tiles in the tile group; and
 determining the tile inclusion based on the number of tiles in the tile group.

14. The method of claim 8, wherein when the tile group is the rectangular tile group, the tile inclusion in the tile group is determined by:
 determining a delta value between the first tile of the tile group and the last tile of the tile group;
 determining a number of tile group rows based on the delta value and a number of tile columns in the picture;
 determining a number of tile group columns based on the delta value and the number of tile columns in the picture; and
 determining the tile inclusion based on the number of tile group rows and the number of tile group columns.

15. A method implemented by a decoder, the method comprising:
 receiving a bitstream comprising a group of tiles in a picture and a parameter set containing a flag, wherein when the flag is set to a first value, the flag specifies a raster scan mode is in use for the group of tiles in the picture, and wherein when the flag is set to a second value, the flag specifies a rectangular mode is in use for the group of tiles in the picture, wherein a raster scan group of tiles contains tiles in consecutive raster scan order of the picture, and a rectangular group of tiles contains tiles collectively forming a rectangular region of the picture; and
 decoding the group of tiles based on the flag.

16. The method of claim 15, wherein the parameter set containing the flag is a picture parameter set.

17. The method of claim 15, wherein an identifier of a first tile of the group of tiles indicates tiles included in the group of tiles.

18. A method implemented by a decoder, the method comprising:
 receiving a bitstream comprising a group of tiles in a picture and a parameter set containing a flag, wherein when the flag is set to a first value, the flag specifies a raster scan mode is in use for the group of tiles in the picture, and wherein when the flag is set to a second value, the flag specifies a rectangular mode is in use for the group of tiles in the picture;
 determining delta values specifying indices of a first tile of each group of tiles; and
 decoding the group of tiles based on the flag and the delta values.

* * * * *